US009406963B2

(12) United States Patent
Lin et al.

(10) Patent No.: US 9,406,963 B2
(45) Date of Patent: Aug. 2, 2016

(54) SOLID OXIDE FUEL CELL INTERCONNECTS INCLUDING A CERAMIC INTERCONNECT MATERIAL AND PARTIALLY STABILIZED ZIRCONIA

(71) Applicants: Guangyong Lin, Shrewsbury, MA (US); Oh-Hun Kwon, Westborough, MA (US); Yeshwanth Narendar, Westford, MA (US)

(72) Inventors: Guangyong Lin, Shrewsbury, MA (US); Oh-Hun Kwon, Westborough, MA (US); Yeshwanth Narendar, Westford, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 640 days.

(21) Appl. No.: 13/724,008

(22) Filed: Dec. 21, 2012

(65) Prior Publication Data
US 2013/0177831 A1   Jul. 11, 2013

Related U.S. Application Data

(60) Provisional application No. 61/579,412, filed on Dec. 22, 2011.

(51) Int. Cl.
*H01M 8/24* (2016.01)
*H01M 8/02* (2016.01)
*H01M 8/12* (2016.01)
*H01M 2/02* (2006.01)

(52) U.S. Cl.
CPC .......... *H01M 8/2465* (2013.01); *H01M 8/0217* (2013.01); *H01M 8/0223* (2013.01); *H01M 8/2425* (2013.01); *H01M 2/02* (2013.01); *H01M 8/0226* (2013.01); *H01M 8/0228* (2013.01); *H01M 8/12* (2013.01); *H01M 8/124* (2013.01); *H01M 2008/1293* (2013.01); *Y02E 60/50* (2013.01); *Y02E 60/525* (2013.01)

(58) Field of Classification Search
CPC .......... H01M 2/02; H01M 8/12; H01M 8/124
See application file for complete search history.

(56) References Cited

U.S. PATENT DOCUMENTS

| 4,830,780 A | 5/1989 | Olson et al. |
| 4,883,497 A | 11/1989 | Claar et al. |
| 4,913,982 A | 4/1990 | Kotchick et al. |
| 5,356,730 A | 10/1994 | Minh et al. |
| 5,496,655 A | 3/1996 | Lessing |

(Continued)

FOREIGN PATENT DOCUMENTS

| CN | 101002355 A | 7/2007 |
| CN | 102099954 A | 6/2011 |

(Continued)

OTHER PUBLICATIONS

International Searh Report for PCT/US2012/071227 mailed Apr. 25, 2013, 2 pages.

(Continued)

*Primary Examiner* — Jeremiah Smith
(74) *Attorney, Agent, or Firm* — Abel Law Group, LLP

(57) ABSTRACT

An interconnect of a solid oxide fuel cell article is disclosed. The interconnect is disposed between a first electrode and a second electrode of the solid oxide fuel cell article. The interconnect comprises a first phase including a ceramic interconnect material and a second phase including partially stabilized zirconia. The partially stabilized zirconia may be in a range of between about 0.1 vol % and about 70 vol % of the total volume of the interconnect.

18 Claims, 20 Drawing Sheets

(56) References Cited

U.S. PATENT DOCUMENTS

| | | | |
|---|---|---|---|
| 5,807,642 | A | 9/1998 | Xue et al. |
| 5,922,486 | A | 7/1999 | Chiao |
| 6,051,330 | A | 4/2000 | Fasano et al. |
| 6,106,967 | A | 8/2000 | Virkar et al. |
| 6,168,745 | B1 | 1/2001 | Jue et al. |
| 6,228,520 | B1 | 5/2001 | Chiao |
| 6,428,920 | B1* | 8/2002 | Badding et al. ............... 429/458 |
| 6,558,831 | B1 | 5/2003 | Doshi et al. |
| 6,737,182 | B2 | 5/2004 | Keegan |
| 6,949,307 | B2 | 9/2005 | Cable et al. |
| 7,990,678 | B2 | 8/2011 | Kawamoto et al. |
| 8,455,154 | B2 | 6/2013 | Kwon et al. |
| 8,658,328 | B2 | 2/2014 | Suda et al. |
| 2001/0044043 | A1 | 11/2001 | Badding et al. |
| 2003/0175573 | A1 | 9/2003 | Yoo et al. |
| 2004/0001994 | A1 | 1/2004 | Marina et al. |
| 2004/0001995 | A1* | 1/2004 | Furuya et al. ................... 429/45 |
| 2004/0018409 | A1 | 1/2004 | Hui et al. |
| 2005/0053819 | A1 | 3/2005 | Paz |
| 2005/0221138 | A1 | 10/2005 | Chinchure et al. |
| 2005/0227134 | A1* | 10/2005 | Nguyen ......................... 429/32 |
| 2006/0147778 | A1 | 7/2006 | Matsuzaki et al. |
| 2007/0009784 | A1 | 1/2007 | Pal et al. |
| 2007/0015045 | A1 | 1/2007 | Lee et al. |
| 2007/0037031 | A1 | 2/2007 | Cassidy et al. |
| 2007/0237999 | A1* | 10/2007 | Donahue et al. ................ 429/32 |
| 2008/0081223 | A1 | 4/2008 | Yasumoto et al. |
| 2008/0090127 | A1* | 4/2008 | Gorte et al. ..................... 429/30 |
| 2010/0003557 | A1 | 1/2010 | Demin et al. |
| 2010/0178589 | A1 | 7/2010 | Kwon et al. |
| 2010/0183947 | A1* | 7/2010 | Mohanram et al. ........... 429/495 |
| 2010/0209802 | A1* | 8/2010 | Armstrong ............ H01M 8/026 429/469 |
| 2010/0297534 | A1 | 11/2010 | Ketcham et al. |
| 2011/0111320 | A1* | 5/2011 | Suda ................... H01M 8/0276 429/465 |
| 2012/0321994 | A1* | 12/2012 | Liu et al. ........................ 429/518 |
| 2013/0177831 | A1 | 7/2013 | Lin et al. |

FOREIGN PATENT DOCUMENTS

| | | |
|---|---|---|
| EP | 0896378 A1 | 2/1999 |
| EP | 1603183 A1 | 12/2005 |
| EP | 1788653 A1 | 5/2007 |
| EP | 2273598 A1 | 1/2011 |
| JP | 62-235214 A | 10/1987 |
| JP | H0439866 A | 2/1992 |
| JP | H05186277 A | 7/1993 |
| JP | 06-044991 | 2/1994 |
| JP | 06-224006 | 8/1994 |
| JP | H1064565 A | 3/1998 |
| JP | 200115129 | 1/2001 |
| JP | 2001-052725 A | 2/2001 |
| JP | 2003288919 A | 10/2003 |
| JP | 2003-323906 A | 11/2003 |
| JP | 2007-180297 | 7/2007 |
| JP | 2008-041468 A | 2/2008 |
| JP | 2008041469 A | 2/2008 |
| WO | 02/29917 A1 | 4/2002 |
| WO | 02/41434 A1 | 5/2002 |
| WO | 2004/082058 | 9/2004 |
| WO | 2006/016627 A1 | 2/2006 |
| WO | 2006/016628 A1 | 2/2006 |
| WO | 2007/074635 A1 | 7/2007 |
| WO | 2008/004389 A1 | 1/2008 |
| WO | 2008/085488 A1 | 7/2008 |
| WO | 2009/085143 A1 | 7/2009 |
| WO | 2010078359 A | 7/2010 |

OTHER PUBLICATIONS

Singh, Prakash et al., "Electrical conduction behavior of La and Mn substituted strontium titanate," Journal of Applied Physics, American Institute of Physics, New York, US, vol. 99, No. 12, Jun. 20, 2006.

Nguyen Q. Minh, Ceramic Fuel Cells, J. Am. Ceramic Soc. 76[3] (1993), pp. 563-588.

Canales-Vazquez, J. et al., "Electrical Properties in La2Sr4Ti6O19-8; a potential anode for high temperature fuel cells," Solid State Ionics, 159: 159-165 (2003).

Carter, J.D. et al., "Reactions at the Calcium Doped Lanthanum Chromite-Yttria Stabilized Zirconia Interface," J. Solid State Chem., 122, Art. No. 0134, pp. 407-415 (1996).

Chick, L.A. et al., "Phase Transitions and Transient Liquid-Phase Sintering in Calcium-Substituted Lanthanum Chromite," J. Am. Ceram. Soc., 80 (8): 2109-2120 (1997).

Fergus, J.W., "Lanthanum Chromite-Based Materials for Solid Oxide Fuel Cell Interconnects," Solid State Ionics, 171: 1-15 (2004).

Fu, Z.X. et al., "La0.4Sr0.6.Ti1-xMnxO3-8 Perovskites as Anode Materials for Solid Oxide Fuel Cells," J. Electrochem. Soc. 153 (4): D74-D83 (2006).

Fujita, K. et al., "Relationship Between Electrochemical Properties of SOFC Cathode and Composition of Oxide Layer Formed on Metallic Interconnects," J. Power Sources 131: 270-277 (2004).

Ghosh, S. et al., "Synthesis of La0.7Ca0.3Cr03 SOFC Interconnect Using a Chromium source," Electrochem. And Solid-State Ltrs, 9 (11): A516-A519 (2006).

Horikiri, F. et al., "Electrical Properties of Nb-Doped SrTiO3 Ceramics with Excess Ti2O2 for SOFC Anodes and Interconnects," Journal of Electrochemical Society, 155(1): B16-B20 (2008).

Huang, W. and Gopalan, S., "Bi-layer Structures as Solid Oxide Fuel Cell Interconnections," J. Power Sources 154: 180-183 (2006).

Hui, S. and Petric, A., "Electrical Conductivity of Yttrium-doped SrTiO3: Influence of Transition Metal Additives," Materials and Research bullentin 37: 1215-1231 (2002).

Hui, S. and Petric, A., "Electrical Properties of Yttrium-Doped Strontium Titanate Under Reducing Conditions," J. Electrochem. Soc., 149 (1): J1-J10 (2002).

Hui, S. and Petric, A., "Evaluation of Yttrium-Doped SrTiO3 as an Anode for Solid Oxide Fuel Cells," J. Euro. Ceram. Soc., 22: 1673-1681 (2002).

Juan Carlos Ruiz-Morales, Jesus Canales-Vazquez, Cristian Savaniu, David Marrero-Lopez, Wuzong Zhou, and John T. S. Irvine, "Disruption of extended defects in solid oxide fuel cell anodes for methane oxidation," Nature, vol. 439, pp. 568-571 (Feb. 2, 2006).

Kawada, T. et al., "Fabrication of a Planar Solid Oxide Fuel Cell by Tape-Casting and Co-Firing Method," J. Ceramic Soc. Of Japan, 100 (60): 847-850 (1992) English Abstract.

Kolodiazhnyi, T. and Petric, A., "The Applicability of Sr-deficient n-type SrTiO3 for SOFC Anodes," Journal of Eclectroceramics, 15: 5-11 (2005).

Liu, Z. et al., "Planar SOFC Stack with Low-Cost Multi-Layer Ceramic Interconnect," Intemaitonal Symposium on Solid Oxide Fuel Cells No. 9, vol. 7 (2), Quebec, Canada (May 2005).

Minh, N.Q. et al., "Fabrication and Characterization of Monolithic Solid Oxide Fuel Cells," IN:IECEC-90, Proceedings of the 25th Intersociety Energy Conversion Engineering Conference, Reno, NV, vol. 3, pp. 230-234, [Published 1990].

Murphy, M.W. et al., "Tape Casting of Lanthanum Chromite," J. Am Ceram. Soc., 80 (1): 165-170 (1997).

International Search Report for PCT/US2009/068509, mailed Jul. 14, 2010, pages.

Raymond, M.V. and Amarakoon, V.R.W., "Microstructure and Electrical Properties of Chemically Prepared Nb2O5-Doped SrTio3 Ceramics," J. Am. Ceram. Soc., 73 (5): 1308-1311 (1990).

Sakai, N. et al., "Lanthanum Chromite-Based Interconnects as Key Materials for SOFC Stack Development," Int. J. Appl. Ceram. Technol., 1 (1): 23-30 (2004).

Sakai, N. et al., "Sinterability and Elcetrical Conductivity of Calcium-Doped Lanthanum Chromites," J. Mater. Sci., 25: 4531-4534 (1990).

Simner, S.P. et al., "Develoopment of Lanthanum Ferrite SOFC Cathodes," J. Power Sources 113: 1-10 (2003).

Simner, S.P. et al., "SOFC Performance with Fe—Cr—Mn Alloy Interconnect," J. Electrochem. Soc., 152 (4): A740-A745 (2005).

Slater, P.R. et al., "Synthesis and Electrical Characterization of Doped Perovskite Titanates as Potential Anode Material for Solid Oxide Fuel Cells," J. Mater. Chem., 7 (12): 2495-3498 (1997).

(56) References Cited

OTHER PUBLICATIONS

Transmittal of International Preliminary Report on Patentability, International Application No. PCT/US2009/068509 mailed on Jun. 30, 2011.

Wincewicz, K.C. and Cooper, J.S., "Taxonomies of SOFC Material and Manufacturing Alternatives," J. Power Sources, 140: 280-296 (2005).

Yang. Z., "Recent Advances in Metallic Interconnects for Solid Oxide Fuel Cells," International Materials Review, 53 (1): 39-54 (2008).

Zhong, Z., "Stoichiometric Lanthanum Chromite Based Ceramic Interconnects with Low Sintering Temperature," Solid State Ionics 177: 757-764 (2006).

Zhou, X. et al., "Preparation and Properties of Ceramic Interconnecting Materials, La0.7Ca0.3Cr3-8 Doped with GDC for IT-SOFCS," J. Power Sources, 162: 279-285 (2006).

Zhu, W.Z.et al., "Development of interconnect materials for solid oxide fuel cells," Materials Science and Engineering A348, pp. 227-243 (2003).

Singhal, S.C. and Kendall, K., "Introduction to SOFCs: In High Temperature Solid Oxide Fuel Cells," Fundamentals, Design and Applications, Singhal & Kendall, eds. (UK: elseveir Advanced Technology), Ch. 1 pp. 1-22, [published 2003].

Koji Tsukuma et al., "Thermal and Mechanical Properties of Y2O3— Partially Stabilized Zirconia", Journal of the Ceramic association, Japan, the Ceramic Society of Japan May 1, 1984, 92 (1065), pp. 233-241.

\* cited by examiner

SOLID OXIDE FUEL CELL INTERCONNECTS INCLUDING A CERAMIC INTERCONNECT MATERIAL AND PARTIALLY STABILIZED ZIRCONIA

CROSS-REFERENCE TO RELATED APPLICATION(S)

The present application claims priority from U.S. Provisional Patent Application No. 61/579,412, filed Dec. 22, 2011, entitled "SOLID OXIDE FUEL CELL INTERCONNECTS INCLUDING A CERAMIC INTERCONNECT MATERIAL AND PARTIALLY STABILIZED ZIRCONIA," naming inventors Guangyong Lin, Oh-Hun Kwon, and Yeshwanth Narendar, which application is incorporated by reference herein in its entirety.

BACKGROUND

1. Field of the Disclosure

The present disclosure is related to solid oxide fuel cells (SOFCs) and more particularly to SOFC interconnects.

2. Description of the Related Art

A fuel cell is a device that generates electricity by a chemical reaction. Among various fuel cells, solid oxide fuel cells (SOFCs) use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode.

In some instances, fuel cell assemblies have been designed as stacks. A single solid oxide fuel cell may include a cathode, an anode, and a solid electrolyte between the cathode and the anode. Each cell can be considered a subassembly, which can be combined with other cells to form a full SOFC stack. In assembling the SOFC stack, electrical interconnects can be disposed between the cathode of one cell and the anode of another cell.

However, stacks of individual fuel cells can be susceptible to damage caused by fluctuation in temperature during their formation or use. Specifically, materials employed to form the various components, including ceramics of differing compositions, exhibit distinct material, chemical, and electrical properties that can result in breakdown and failure of the SOFC article. In particular, fuel cells have a limited tolerance for changes in temperature. Problems associated with mechanical stress caused by changes in temperature can be exacerbated when individual fuel cells are stacked. Limited thermal shock resistance of fuel cells, particularly of fuel cells assembled in stacks, may limit the yield of production, posing a heightened risk of failure during operation.

SUMMARY

According to one embodiment, an interconnect of a solid oxide fuel cell article is disclosed. The interconnect is disposed between a first electrode and a second electrode of the solid oxide fuel cell article. The interconnect comprises a first phase including a ceramic interconnect material and a second phase including partially stabilized zirconia. The partially stabilized zirconia is in a range of between about 0.1 vol % and about 70 vol % of the total volume of the interconnect.

According to another embodiment, a method of forming an interconnect of a solid oxide fuel cell article is disclosed. The method includes sintering a ceramic interconnect material and partially stabilized zirconia, where the ceramic interconnect material is a first phase and the partially stabilized zirconia is a second phase that is substantially uniformly dispersed in the first phase. The partially stabilized zirconia is in a range of between about 0.1 vol % and about 70 vol % of the total volume of the ceramic interconnect material and the partially stabilized zirconia.

According to another embodiment, a solid oxide fuel cell article is disclosed. The solid oxide fuel cell article includes an interconnect, a first electrode layer, and a second electrode layer. The interconnect comprises a first phase including a ceramic interconnect material and a second phase including partially stabilized zirconia. The first electrode layer includes a first ceramic material directly contacting the interconnect, and the second electrode layer comprises a second ceramic material directly contacting the interconnect.

According to another embodiment, a solid oxide fuel cell article is disclosed that includes a cathode, an anode, and an interconnect disposed between the cathode and the anode. The interconnect comprises a first phase including a lanthanum doped strontium titanate (LST) material and a second phase including partially stabilized zirconia. The partially stabilized zirconia is in a range of between about 0.1 vol % and about 70 vol % of the total volume of the interconnect.

According to yet another embodiment, a solid oxide fuel cell article is disclosed that includes a cathode, an anode, and an interconnect disposed between the cathode and the anode. The interconnect comprises a first phase and a second phase. The interconnect has a first concentration of partially stabilized zirconia at an interface of the interconnect and the cathode and a second concentration of partially stabilized zirconia at an interface of the interconnect and the anode. The first concentration is different than the second concentration.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION

The present disclosure is related to interconnects of solid oxide fuel cell articles and methods of forming interconnects of solid oxide fuel cell articles.

Figure 1:
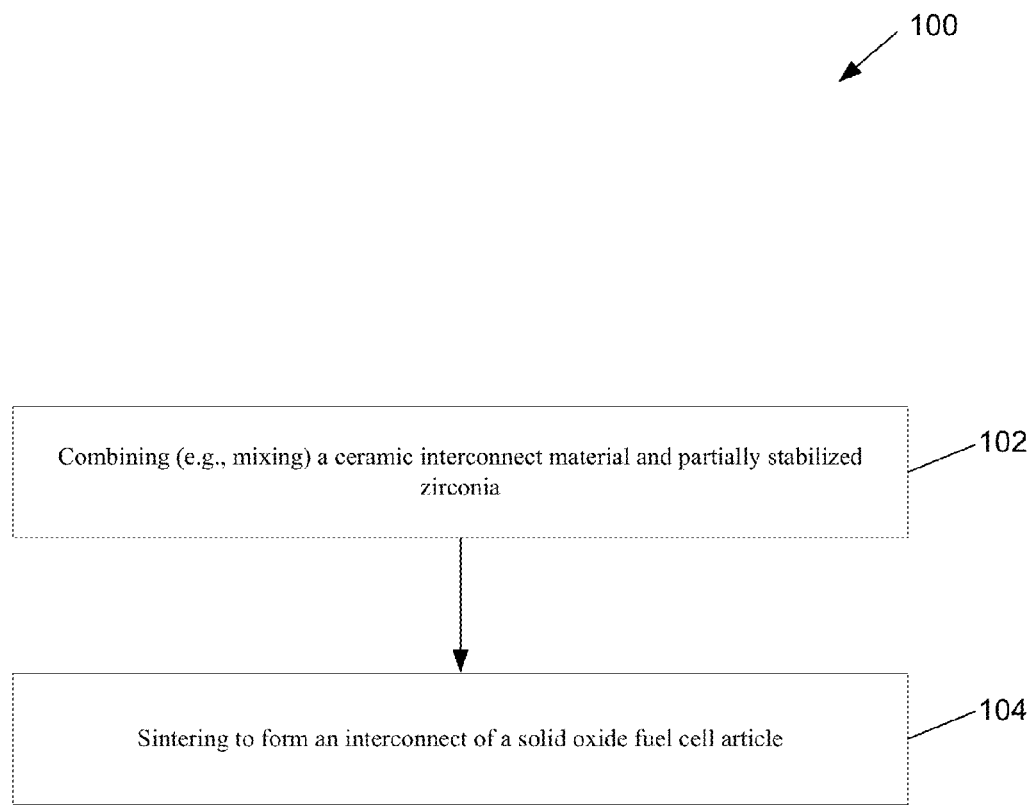
FIG. 1 illustrates a method of forming an interconnect of a solid oxide fuel cell (SOFC) article according to an embodiment.

Referring to FIG. 1, a particular embodiment of a method of forming an interconnect of a solid oxide fuel cell article is illustrated and generally designated 100. The method 100 includes, at step 102, combining (e.g., mixing) a ceramic interconnect material and partially stabilized zirconia. In a particular embodiment, the ceramic interconnect material and the partially stabilized zirconia can be mixed by a conventional ceramic process such as ball milling.

In a particular embodiment, one or more binders may be added into the mixtures before finishing the ball milling to improve the green forming during die-pressing disks and bar samples for the strength and conductivity measurements. For example, the binders may include 0.5 wt % of polyvinyl alcohol (PVA) Celvol 205, from Celanese Chemicals Ltd (Dallas, Tex.) and 0.75 wt % of polyethylene glycol (PEG-400) from Mallinckrodt Baker, Inc. (Paris, Ky.).

The method 100 further includes sintering the ceramic interconnect material and the partially stabilized zirconia to form the interconnect of the solid oxide fuel cell article, at step 104. For example, sintering may be performed at a sintering temperature that is in a range of between about 1200° C. and about 1650° C., such as in a range of between about 1250° C. and about 1600° C., or in a range of between about 1300° C. and about 1550° C. It will be appreciated that the sintering temperature may be within any of the ranges noted above.

One function of an interconnect in an SOFC article is as a connector to provide an electron conductor so that the electron can be transferred from one cell to another. Another function of the interconnect is as a gas separator to prevent fuel gas (e.g., $H_2$ or $CH_4$) at the anode side from mixing with an oxidant (e.g., air) at the cathode side. Any cracks in the interconnect may cause the reduction of the electron conduction area and may allow gas cross leakage, reducing its functions as the electron conductor and the gas separator. Therefore, any cracks in the interconnect should be avoided.

In a particular embodiment, the interconnect may be co-sintered with other components of the SOFC article. Thermal stress and cracking may be caused by a coefficient of thermal expansion (CTE) mismatch of the ceramic interconnect material with other components of the SOFC article. In a particular embodiment, the partially stabilized zirconia includes tetragonal t-$ZrO_2$ at the sintering temperature. The tetragonal t-$ZrO_2$ may transition to monoclinic m-$ZrO_2$ at a tetragonal to monoclinic (t-m) phase transformation temperature that is less than the sintering temperature. The partially stabilized zirconia may change volume during the t-m phase transformation. For example, the change in volume of the partially stabilized zirconia may be in a range of between about 3 vol % and about 5 vol %.

Figure 2:
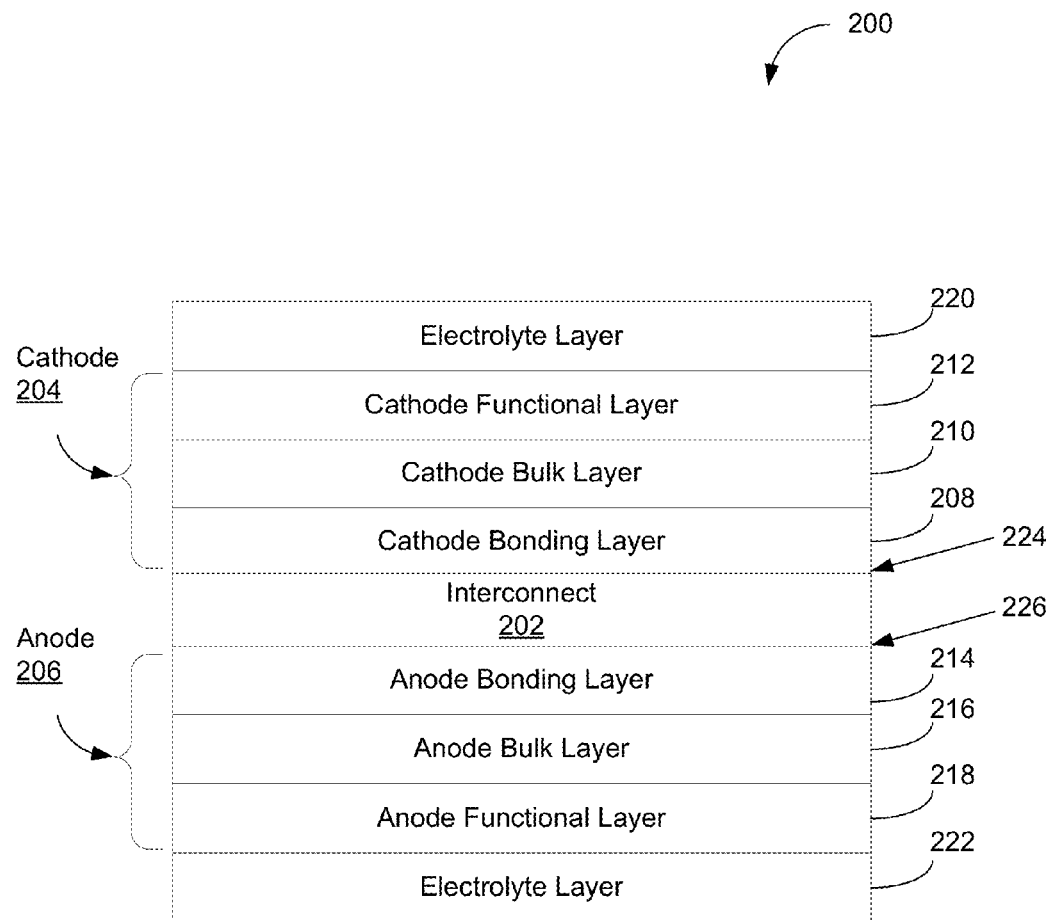
FIG. 2 includes an illustration of an SOFC article in accordance with an embodiment.

Referring to FIG. 2, a particular embodiment of an SOFC article 200 including an interconnect 202 is illustrated. In a particular embodiment, the interconnect 202 of FIG. 2 may be formed via the method 100 of FIG. 1. The interconnect 202 can include a first phase including a ceramic interconnect material and a second phase including partially stabilized zirconia. In a particular embodiment, the second phase may consist essentially of partially stabilized zirconia. In the particular embodiment illustrated in FIG. 2, the interconnect 202 includes a single discrete interconnect layer that is disposed between a first electrode (e.g., a cathode 204) and a second electrode (e.g., an anode 206). In alternative embodiments, the interconnect 202 may include multiple discrete interconnect layers (See e.g. FIG. 3).

The cathode 204 and the anode 206 may include multiple electrode layers. In the embodiment illustrated in FIG. 2, the cathode 204 includes a cathode bonding layer 208, a cathode bulk layer 210, and a cathode functional layer 212. Further, in the embodiment illustrated in FIG. 2, the anode 206 includes an anode bonding layer 214, an anode bulk layer 216, and an anode functional layer 218. Thus, the cathode bonding layer 208 may be a first electrode layer (including a first ceramic material) directly contacting the interconnect 202, the cathode bulk layer 210 may be directly contacting the cathode bonding layer 208, and the cathode functional layer 212 may be directly contacting the cathode bulk layer 210. The anode bonding layer 214 may be a second electrode layer (including a second ceramic material) directly contacting the interconnect 202, the anode bulk layer 216 may be directly contacting the anode bonding layer 214, and the anode functional layer 218 may be directly contacting the anode bulk layer 216. The cathode functional layer 212 may be in direct contact with an electrolyte layer 220, and the anode functional layer 218 may be in direct contact with another electrolyte layer 222. A person of ordinary skill in the art will appreciate that the SOFC article 200 illustrated in FIG. 2 may include additional layers. For example, an SOFC stack may include multiple SOFC unit cells, each including a cathode, an anode, and an electrolyte, with the individual SOFC unit cells connected via interconnects such as the interconnect 202 of FIG. 2.

In a particular embodiment, each of the layers illustrated in FIG. 2 can be formed separately as green layers and assembled together. Alternatively, the layers may be formed in green state in succession on each other. Reference herein to "green" articles is reference to materials that have not undergone sintering to affect densification or grain growth. A green article is an unfinished article that may be dried and have low water content, but is unfired. A green article can have suitable strength to support itself and other green layers formed thereon.

The layers described according to the embodiments herein can be formed through techniques including, but not limited to, casting, deposition, printing, extruding, lamination, die-pressing, gel casting, spray coating, screen printing, roll compaction, injection molding, and a combination thereof. In one particular instance, each of the layers can be formed via screen printing. In another embodiment, each of the layers can be formed via a tape casting process.

The interconnect 202 includes a first phase including a ceramic interconnect material and a second phase including partially stabilized zirconia. The partially stabilized zirconia is in a range of between about 0.1 vol % and about 70 vol % of the total volume of the interconnect 202. For example, the partially stabilized zirconia may be in a range of between about 1 vol % and about 70 vol %, such as in a range of between about 5 vol % and about 70 vol %, in a range of between about 10 vol % and about 70 vol %, in a range of between about 15 vol % and about 70 vol %, or in a range of between about 20 vol % and about 70 vol %. As another example, the partially stabilized zirconia may be in a range of between about 1 vol % and about 50 vol %, in a range of between about 5 vol % and about 50 vol %, in a range of between about 10 vol % and about 50 vol %, in a range of between about 15 vol % and about 50 vol %, in a range of between about 20 vol % and about 50 vol %, or in a range of between about 20 vol % and about 40 vol %. It will be appreciated that the volume percentage of partially stabilized zirconia may be within any of the ranges noted above.

As an illustrative non-limiting example, the ceramic interconnect material may include $La_xSr_{1-x}TiO_3$, where x is not less than about 0.001 and x is not greater than about 0.50. That is, the ceramic interconnect material may include a lanthanum doped strontium titanate material, referred to herein as an "LST" material. In a non-limiting illustrative embodiment, x may be about 0.2 (i.e., $La_{0.2}Sr_{0.8}TiO_3$), referred to herein as "LST28".

As another example, the ceramic interconnect material may include $La_xSr_{1-x}Ti_{1-y}Nb_yO_3$, where x is not less than about 0.001 and x is not greater than about 0.50, and where y is not less than about 0.001 and y is not greater than about 0.25. That is, the ceramic interconnect material may include an LST material that is further doped with $Nb_2O_5$, referred to herein as an "LSTN" material. For example, the $Nb_2O_5$ dopant content may be not less than about 0.01 mol %, such as not less than about 0.1 mol %, or even not less than about 0.5 mol %. As another example, the $Nb_2O_5$ dopant content may be not greater than about 12.0 mol %, such as not greater than about 11.0 mol %, not greater than about 10.0 mol %, not greater than about 9.0 mol %, or even not greater than about 8.0 mol %. It will be appreciated that the $Nb_2O_5$ dopant content can be within a range including any of the minimum and maximum values noted above. In an illustrative, non-limiting embodiment, the $Nb_2O_5$ dopant content may be in a range of between about 0.5 mol % $Nb_2O_5$ and about 8.0 mol % $Nb_2O_5$. For example, the $Nb_2O_5$ dopant content may be about 4.0 mol % $Nb_2O_5$, referred to herein as "LSTN4.0". As another example, the $Nb_2O_5$ dopant content may be about 6.0 mol % $Nb_2O_5$, referred to herein as "LSTN6.0".

As discussed above, thermal stress and cracking may be caused by a coefficient of thermal expansion (CTE) mismatch of the ceramic interconnect material with other components of the SOFC article, particularly with components that are adjacent and/or directly contacting the interconnect. In a particular embodiment, an interconnect material may be chosen to have a CTE that more closely matches the CTE value of another component of the SOFC article directly contacting the interconnect, such as an anode functional layer (AFL), cathode functional layer (CFL), anode bonding layer, or cathode bonding layer, for example. In at least one embodiment, the interconnect material may have a lower CTE than that of a component directly contacting the interconnect, such that cooling of the SOFC article from high temperatures may place the interconnect in compression. In these embodiments, the difference in CTE ($\Delta$ CTE) between the interconnect material and the other component may be not greater than about $0.9°$ C.$\times 10^{-6}$/K, such as not greater than about $0.8°$ C.$\times 10^{-6}$/K, such as less than about $0.7°$ C.$\times 10^{-6}$/K, such as less than about $0.6°$ C.$\times 10^{-6}$/K, such as less than about $0.5°$ C.$\times 10^{-6}$/K, such as less than about $0.4°$ C.$\times 10^{-6}$/K, such as less than about $0.3°$ C.$\times 10^{-6}$/K, such as less than about $0.2°$ C.$\times 10^{-6}$/K. In an embodiment, the $\Delta$ CTE between the interconnect material and the other component is preferably greater than about $0.1°$ C.$\times 10^{-6}$/K, such as greater than about $0.2°$ C.$\times 10^{-6}$/K.

In at least one embodiment, the interconnect material may have a higher CTE than that of a component directly contacting the interconnect. In these embodiments, the difference in CTE ($\Delta$ CTE) between the interconnect material and the other component may be less than about $0.9°$ C.$\times 10^{-6}$/K, such as less than about $0.8°$ C.$\times 10^{-6}$/K, such as less than about $0.7°$ C.$\times 10^{-6}$/K, such as less than about $0.6°$ C.$\times 10^{-6}$/K, such as less than about $0.5°$ C.$\times 10^{-6}$/K, such as less than about $0.4°$ C.$\times 10^{-6}$/K, such as less than about $0.3°$ C.$\times 10^{-6}$/K, such as less than about $0.2°$ C.$\times 10^{-6}$/K. In an embodiment, the $\Delta$ CTE between the interconnect material and the other component may be greater than about $0.1°$ C.$\times 10^{-6}$/K, such as greater than about $0.2°$ C.$\times 10^{-6}$/K.

In an embodiment, the interconnect material has a CTE measured at 1200° C. that may be that about $11.8°$ C.$\times 10^{-6}$/K, such as less than about $11.3°$ C.$\times 10^{-6}$/K, such as less than about $11.2°$ C.$\times 10^{-6}$/K, such as less than about $11.1°$ C.$\times 10^{-6}$/K, and greater than about $10.9°$ C.$\times 10^{-6}$/K, such as greater than about $11.0°$ C.$\times 10^{-6}$/K. In an embodiment, the interconnect material has a CTE measured at 900° C. that may be less than about $11.0°$ C.$\times 10^{-6}$/K, such as less than about $10.8°$ C.$\times 10^{-6}$/K, and greater than about $10.4°$ C.$\times 10^{-6}$/K, such as greater than about $10.5°$ C.$\times 10^{-6}$/K. In a particular embodiment, the interconnect material includes LSTN6.0. In another particular embodiment, at least one discrete layer of the interconnect includes LSTN6.0.

In another embodiment, the ceramic interconnect material may include $La_xSr_{1-x}Ti_{1-y}Mn_yO_3$, where x is not less than about 0.001 and x is not greater than about 0.50, and where y is not less than about 0.001 and y is not greater than about 0.70. In another embodiment, the ceramic interconnect material may include $Sr_{1-1.5z}Y_zTiO_3$, where z is not less than about 0.001 and z is not greater than about 0.30. In another embodiment, the ceramic interconnect material may include $Sr_{1.05k}Nb_kTi_{1-k}O_3$, where k is not less than about 0.001 and k is not greater than about 0.30.

It will be appreciated that the interconnect 202 can include more than one ceramic interconnect material. As an illustrative, non-limiting example, the interconnect 202 may include a first ceramic interconnect material (e.g., LST28) and a second ceramic interconnect material (e.g., LSTN4.0 or LSTN 6.0). Further, the interconnect 202 may have a first concentration of a ceramic material at an interface of the interconnect 202 and the cathode 204 (i.e., a "cathode interface" 224) and may have a different concentration of the ceramic material at an interface of the interconnect 202 and the anode 206 (i.e., an "anode interface" 226).

The interconnect 202 can be a particularly thin, planar layer of material. For example, the interconnect 202 may have an average thickness that is not greater than about 100 µm, such as not greater than about 90 µm, not greater than about 80 µm, not greater than about 70 µm, not greater than about 60 µm, or even not greater than about 50 µm. Further, the interconnect 202 may have an average thickness that is not less than about 5 µm, not less than about 6 µm, not less than about 7 µm, not less than about 8 µm, not less than about 9 µm, or even not less than about 10 µm. It will be appreciated that the interconnect 202 can have an average thickness within a range including any of the minimum and maximum values noted above.

The first phase of the interconnect 202 including the ceramic interconnect material may have an average grain size ("A") of not greater than about 40 µm, such as not greater than about 30 µm, not greater than about 20 µm, not greater than about 15 µm, or not greater than about 10 µm. The average grain size A may be not less than about 0.05 µm, such as not less than 0.1 µm, not less than about 0.5 µm, not less than about 1 µm, or not less than about 2 µm. It will be appreciated that the ceramic interconnect material can have an average grain size A within a range including any of the minimum and maximum values noted above.

The second phase of the interconnect 202 including the partially stabilized zirconia may have an average grain size ("B"). The average grain size B may be not greater than about 20 µm, such as not greater than about 10 µm, not greater than about 9 µm, not greater than about 8 µm, not greater than about 7 µm, not greater than about 6 µm, or not greater than about 5 µm. The average grain size B may be not less than about 0.01 µm, such as not less than about 0.05 µm, not less than about 0.1 µm, not less than about 0.5 µm, or not less than about 1 µm. It will be appreciated that the partially stabilized zirconia can have an average grain size B within a range including any of the minimum and maximum values noted above.

The average grain size B of the second phase may be less than the average grain size A of the first phase. A percentage difference in grain size between the average grain size B and the average grain size A may be determined based on the formula: $[(A-B)/A]*100\%$. In a particular embodiment, the average grain size B of the second phase may be at least about 5% less than the average grain size A of the first phase, such as at least about 10% less than the average grain size A, at least about 15% less than the average grain size A, or at least about 20% less than the average grain size A. In a particular embodiment, the average grain size B of the second phase may be not greater than about 90% less than the average grain size A of the first phase, such as not greater than about 80% less than the average grain size A, not greater than about 70% less than the average grain size A, or not greater than about 60% less than the average grain size A. It will be appreciated that the percentage difference in grain size between the average grain size B and the average grain size A may be within a range including any of the minimum and maximum values noted above.

In a particular embodiment, the first phase including the ceramic interconnect material may be a continuous phase and the second phase including the partially stabilized zirconia may be a discontinuous phase that is substantially uniformly dispersed in the first phase. A majority of the content of the second phase may be disposed at the grain boundaries of the first phase. As an illustrative example, FIG. 16 includes an SEM image (at a magnification of 10 k) of an interconnect material (LSTN4.0-3Y10) where a majority of the content of the second phase (including 3YSZ) is disposed at the grain boundaries of the first phase (including the ceramic interconnect material LSTN4.0).

In a particular embodiment, the interconnect 202 may have a first concentration of partially stabilized zirconia ("PSZ1") at the cathode interface 224, and the interconnect 202 may have a second concentration of partially stabilized zirconia ("PSZ2") at the anode interface 226. The first concentration PSZ1 at the cathode interface 224 may be different than the second concentration PSZ2 at the anode interface 226. For example, the second concentration PSZ2 (e.g., vol. % PSZ) at the anode interface 226 may be higher than the first concentration PSZ1 (e.g., vol. % PSZ) at the cathode interface 224. In a particular embodiment, the interconnect 202 may have a concentration gradient for the partially stabilized zirconia over the thickness of interconnect 202 (i.e., a dimension of the interconnect 202 that is defined by the cathode interface 224 and the anode interface 226). For example, the concentration of partially stabilized zirconia may decrease over the thickness of the interconnect 202 from the anode interface 226 to the cathode interface 224. In one embodiment, the first concentration PSZ1 at the cathode interface 224 may be substantially zero.

A percentage difference in concentration of partially stabilized zirconia between the cathode interface 224 and the anode interface 226 may be determined based on the formula: [(PSZ2−PSZ1)/PSZ2]*100%. In a particular embodiment, the first concentration PSZ1 at the cathode interface 224 may be at least about 5% less than the second concentration PSZ2 at the anode interface 226, such as at least about 10% less than the second concentration PSZ2, at least about 20% less than the second concentration PSZ2, at least about 30% less than the second concentration PSZ2, at least about 40% less than the second concentration PSZ2, or at least about 50% less than the second concentration PSZ2. In a particular embodiment, the first concentration PSZ1 at the cathode interface 224 may be not greater than about 100% less than the second concentration PSZ2 at the anode interface 226, such as not greater than about 99.9% less than the second concentration PSZ2, not greater than about 99.5% less than the second concentration PSZ2, not greater than about 99% less than the second concentration PSZ2, not greater than about 98% less than the second concentration PSZ2, or not greater than about 95% less than the second concentration PSZ2. It will be appreciated that the percentage difference in concentration of partially stabilized zirconia between the cathode interface 224 and the anode interface 226 may be within a range including any of the minimum and maximum values noted above.

The partially stabilized zirconia may include $ZrO_2$ and a stabilizing oxide. In a particular embodiment, the partially stabilized zirconia includes not less than about 0.1 mol % stabilizing oxide of the total moles of the partially stabilized zirconia, such as not less than about 0.2 mol % stabilizing oxide, not less than about 0.3 mol % stabilizing oxide, not less than about 0.4 mol % stabilizing oxide, or not less than about 0.5 mol % stabilizing oxide. The partially stabilized zirconia may include not greater than about 8.0 mol % stabilizing oxide of the total moles of the partially stabilized zirconia, such as not greater than about 7.0 mol % stabilizing oxide, not greater than about 6.0 mol % stabilizing oxide, not greater than about 5.0 mol % stabilizing oxide, not greater than about 4.0 mol % stabilizing oxide, or not greater than about 3.5 mol % stabilizing oxide. It will be appreciated that the partially stabilized zirconia can include a molar percentage of stabilizing oxide within a range including any of the minimum and maximum values noted above.

In a particular embodiment, the stabilizing oxide may include $Y_2O_3$, $CeO_2$, CaO, MgO, or a combination thereof. In a particular embodiment, the stabilizing oxide includes $Y_2O_3$. For example, the partially stabilized zirconia may include $ZrO_2$ and $Y_2O_3$ in a range of between about 1.0 mol % $Y_2O_3$ and about 5.0 mol % $Y_2O_3$, such as in a range of between about 2.0 mol % $Y_2O_3$ and about 4.0 mol % $Y_2O_3$, or in a range of between about 2.5 mol % $Y_2O_3$ and about 3.5 mol % $Y_2O_3$. In an illustrative, non-limiting embodiment, the partially stabilized zirconia includes $ZrO_2$ and $Y_2O_3$ in a range of between about 1.0 mol % $Y_2O_3$ and about 5.0 mol % $Y_2O_3$. For example, the partially stabilized zirconia may include about 3.0 mol % $Y_2O_3$. It will be appreciated that the molar percentage of $Y_2O_3$ may be within any of the ranges noted above.

In a particular embodiment, the partially stabilized zirconia may include single phase tetragonal $t-ZrO_2$ at an operating temperature of the solid oxide fuel cell article 200. In another embodiment, the partially stabilized zirconia may include two phase tetragonal $t-ZrO_2$ and cubic $f-ZrO_2$ at the operating temperature of the solid oxide fuel cell article 200. For example, the operating temperature may be in a range of between about 700° C. and about 1000° C., such as in a range of between about 750° C. and about 950° C., or in a range of between about 800° C. and about 900° C. It will be appreciated that the operating temperature of the solid oxide fuel cell article 200 may be within any of the ranges noted above.

The second phase of the interconnect 202 including the partially stabilized zirconia may undergo a tetragonal to monoclinic (t-m) phase transformation. During the t-m phase transformation, the second phase including the partially stabilized zirconia may change volume in a range of between about 3 vol % and about 5 vol %. In a particular embodiment, the partially stabilized zirconia may undergo the t-m phase transformation at a t-m phase transformation temperature that is less than the operating temperature of the solid oxide fuel cell article.

In a particular embodiment, the porosity of the interconnect 202 may be not less than about 0.05 vol %, such as not less than about 0.1 vol %, not less than about 0.2 vol %, or not less than about 0.5 vol %. The porosity of the interconnect 202 may be not greater than about 5 vol %, such as not greater than about 4 vol %, not greater than about 3 vol %, or not greater than about 2 vol %. It will be appreciated that the interconnect 202 can have a porosity within a range including any of the minimum and maximum values noted above.

In a particular embodiment, the interconnect 202 may have a volume conductivity in a forming gas atmosphere comprising about 4 vol % $H_2$ and about 96 vol % $N_2$ of not less than about 1 S/cm (e.g., at a temperature of about 800° C., about 900° C., or about 1000° C.), such as not less than about 2 S/cm, not less than about 3 S/cm, not less than about 4 S/cm, or not less than about 5 S/cm. The interconnect 202 may have a volume conductivity in a forming gas atmosphere comprising about 4 vol % $H_2$ and about 96 vol % $N_2$ of not greater than about 25 S/cm, such as not greater than about 20 S/cm, or not greater than about 15 S/cm. It will be appreciated that the interconnect 202 can have a volume conductivity in a forming gas atmosphere within a range including any of the minimum and maximum values noted above.

In a particular embodiment, the interconnect 202 may have a biaxial flexure strength of not less than about 40 MPa, such as not less than about 45 MPa, not less than about 50 MPa, not less than about 55 MPa, not less than about 60 MPa, not less than about 65 MPa, not less than about 70 MPa, not less than about 75 MPa, not less than about 80 MPa, not less than about 85 MPa, or not less than about 90 MPa. The interconnect 202 may have a biaxial flexure strength of not greater than about 200 MPa, such as not greater than about 190 MPa, or not greater than about 180 MPa. It will be appreciated that the interconnect 202 can have a biaxial flexure strength within a range including any of the minimum and maximum values noted above.

Materials for the cathode bulk layer 210 generally include lanthanum manganate materials. Particularly, the cathode can be made of a doped lanthanum manganate material, giving the cathode composition a perovskite type crystal structure. Accordingly, the doped lanthanum manganate material has a general composition represented by the formula, $(La_{1-x}A_x)_yMnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. According to a particular embodiment, the dopant is Sr, and the cathode bulk layer 210 may include a lanthanum strontium manganate material, known generally as LSM. In an exemplary embodiment, the cathode bonding layer 208 may include an LSM material and yttria stabilized zirconia, known generally as YSZ.

Referring to the stoichiometry of the doped lanthanum manganate cathode material, according to one embodiment, parameters such as the type of atoms present, the percentage of vacancies within the crystal structure, and the ratio of atoms, particularly the ratio of La/Mn within the cathode material, are provided to manage the formation of conductivity-limiting compositions at the cathode/electrolyte interface during the operation of the fuel cell. The formation of conductivity-limiting compositions reduces the efficiency of the cell and reduces the lifetime of the SOFC. According to one embodiment, the doped lanthanum manganate cathode material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganate composition represents the amount of dopant substituted for La within the structure. In further reference to the stoichiometry of the cathode, the value of y in the general formula $(La_{1-x}A_x)_yMnO_{3-\delta}$ represents the percent occupancy of atoms on the A-site within the crystal lattice. Thought of another way, the value of y may also be subtracted from 1.0 and represent the percentage of vacancies on the A-site within the crystal lattice. For the purposes of this disclosure, a doped lanthanum manganate material having a value of y less than 1.0 is termed an "A-site deficient" structure, since the A-sites within the crystal structure are not 100% occupied.

In a particular embodiment, the dopant material is Sr (an LSM cathode), such that the composition of the cathode bulk layer 210 is $(La_{1-x}Sr_x)_yMnO_{3-\delta}$, where x is not greater than about 0.5, such as not greater than about 0.4, 0.3, 0.2 or even not greater than about 0.1, and particularly within a range of between about 0.3 and 0.05. In a particular embodiment, the value of y is not greater than about 1.0. In an illustrative non-limiting embodiment, x is about 0.2 and y is about 0.98, such that the cathode bulk layer 210 includes an LSM material with a composition of $(La_{0.8}Sr_{0.2})_{0.98}MnO_3$. A cathode having an A-site deficient, doped lanthanum manganate composition, as provided in the previously described embodiments, may reduce the formation of conductivity-limiting compositions at the cathode/electrolyte interface during the operation of the fuel cell.

Alternatively, or additionally, the material of the cathode can include a La-ferrite based material. Typically, the La-ferrite based material can be doped with one or more suitable dopants, such as Sr, Ca, Ba, Mg, Ni, Co or Fe. Examples of doped La-ferrite based materials include LaSrCo-ferrite (LSCF) (e.g., $La_{1-q}Sr_q Co_{1-j}Fe_jO_3$, where each of q and j independently is equal to or greater than 0.1, and equal to or less than 0.4 and (La+Sr)/(Fe+Co) is in a range of between about 1.0 and about 0.90 (molar ratio). In one specific embodiment, the cathode can include a mixture of a La-manganite and La-ferrite material. For example, the cathode can include a LaSr-manganite (LSM) (e.g., $La_{1-k}Sr_kMnO_3$) and a LaSrCo-ferrite (LSCF). Common examples include $(La_{0.8}Sr_{0.2})_{0.98}Mn_{3+\Delta}$ ($\Delta$ is equal to or greater than zero, and equal to or less than 0.3) and $La_{0.6}Sr_{0.4}Co_{0.4}Fe_{0.6}O_3$.

The cathode bulk layer 210 may have an average thickness of not less than about 0.10 mm, such not less than about 0.15 mm, not less than about 0.20 mm, or even not less than about 0.25 mm. Further, the cathode bulk layer 210 may have an average thickness that is not greater than about 2 mm, such as not greater than about 1.9 mm, not greater than about 1.8 mm, not greater than about 1.7 mm, not greater than about 1.6 mm, or even not greater than about 1.5 mm. It will be appreciated that the cathode bulk layer 210 can have an average thickness within a range including any of the minimum and maximum values noted above.

The cathode bulk layer 210 may be a porous layer, having a porosity within a range between about 30 vol % and about 60 vol %, for the total volume of the cathode bulk layer 210. The cathode bulk layer 210 can have an average pore size that is significantly greater than an average pore size of pores within the cathode functional layer 212 or the cathode bonding layer 208.

The cathode bonding layer 208 may have an average thickness that is not greater than about 100 µm, such as not greater than about 90 µm, not greater than about 80 µm, not greater than about 70 µm, not greater than about 60 µm, or even not greater than about 50 µm. Further, the cathode bonding layer 208 may have an average thickness that is not less than about 5 µm, not less than about 6 µm, not less than about 7 µm, not less than about 8 µm, not less than about 9 µm, or even not less than about 10 µm. It will be appreciated that the cathode bonding layer 208 can have an average thickness within a range including any of the minimum and maximum values noted above.

The porosity of the cathode bonding layer 208 may be not less than about 5 vol %, such as not less than about 6 vol %, not less than about 7 vol %, not less than about 8 vol %, not less than about 9 vol %, not less than about 10 vol %, not less than about 11 vol %, or even not less than about 12 vol %. Further, the porosity of the cathode bonding layer 208 may be not greater than about 60 vol %, such as not greater than about 55 vol %, not greater than about 50 vol %, not greater than about 45 vol %, or even not greater than about 40 vol %. It will be appreciated that the cathode bonding layer 208 can have a porosity within a range including any of the minimum and maximum values noted above.

The cathode functional layer 212 may have an average thickness that is not greater than about 100 µm, such as not greater than about 90 µm, not greater than about 80 µm, not greater than about 70 µm, not greater than about 60 µm, or even not greater than about 50 µm. Further, the cathode functional layer 212 may have an average thickness that is not less than about 5 µm, not less than about 6 µm, not less than about 7 µm, not less than about 8 µm, not less than about 9 µm, or even not less than about 10 µm. It will be appreciated that the cathode functional layer 212 can have an average thickness within a range including any of the minimum and maximum values noted above.

The cathode functional layer 212 may be a porous layer, having a porosity within a range between about 20 vol % and about 50 vol %, for the total volume of the cathode functional layer 212. The cathode functional layer 212 can have an average pore size that is significantly smaller than an average pore size of pores within the cathode bulk layer 210.

The anode bulk layer 216 may include a cermet material, that is, a combination of a ceramic and metallic material. For example, the anode bulk layer 216 may be formed with nickel and YSZ. The nickel is generally produced through the reduction of nickel oxide included in the anode precursor, such as a green ceramic composition that is heat-treated. That is, the anode bulk layer 216 may include a nickel oxide and YSZ (before reduction) or nickel and YSZ (after reduction). The anode bonding layer 214 may also include a nickel oxide and YSZ (before reduction) or nickel and YSZ (after reduction).

The anode bulk layer 216 may have an average thickness of not less than about 0.10 mm, such not less than about 0.15 mm, not less than about 0.20 mm, or even not less than about 0.25 mm. Further, the anode bulk layer 216 may have an average thickness that is not greater than about 2 mm, such as not greater than about 1.9 mm, not greater than about 1.8 mm, not greater than about 1.7 mm, not greater than about 1.6 mm, or even not greater than about 1.5 mm. It will be appreciated that the anode bulk layer 216 can have an average thickness within a range including any of the minimum and maximum values noted above.

The anode bulk layer 216 may be a porous layer, having a porosity within a range between about 30 vol % and about 60 vol %, for the total volume of the anode bulk layer 216. The anode bulk layer 216 can have an average pore size that is significantly greater than an average pore size of pores within the anode functional layer 218 or the anode bonding layer 214.

The anode bonding layer 214 may have an average thickness that is not greater than about 100 µm, such as not greater than about 90 µm, not greater than about 80 µm, not greater than about 70 µm, not greater than about 60 µm, or even not greater than about 50 µm. Further, the anode bonding layer 214 may have an average thickness that is not less than about 5 µm, not less than about 6 µm, not less than about 7 µm, not less than about 8 µm, not less than about 9 µm, or even not less than about 10 µm. It will be appreciated that the anode bonding layer 214 can have an average thickness within a range including any of the minimum and maximum values noted above.

The porosity of the anode bonding layer 214 may be not less than about 5 vol %, such as not less than about 6 vol %, not less than about 7 vol %, not less than about 8 vol %, not less than about 9 vol %, not less than about 10 vol %, not less than about 11 vol %, or even not less than about 12 vol %. Further, the porosity of the anode bonding layer 214 may be not greater than about 60 vol %, such as not greater than about 55 vol %, not greater than about 50 vol %, not greater than about 45 vol %, or even not greater than about 40 vol %. It will be appreciated that the anode bonding layer 214 can have a porosity within a range including any of the minimum and maximum values noted above.

The anode functional layer 218 may have an average thickness that is not greater than about 100 µm, such as not greater than about 90 µm, not greater than about 80 µm, not greater than about 70 µm, not greater than about 60 µm, or even not greater than about 50 µm. Further, the anode functional layer 218 may have an average thickness that is not less than about 5 µm, not less than about 6 µm, not less than about 7 µm, not less than about 8 µm, not less than about 9 µm, or even not less than about 10 µm. It will be appreciated that the anode functional layer 218 can have an average thickness within a range including any of the minimum and maximum values noted above.

The anode functional layer 218 may be a porous layer, having a porosity within a range between about 20 vol % and about 50 vol %, for the total volume of the anode functional layer 218. The anode functional layer 218 can have an average pore size that is significantly smaller than an average pore size of pores within the anode bulk layer 216.

The electrolyte layers 220, 222 can include an inorganic material, such as a ceramic material. For example, the electrolyte layers 220, 222 can include an oxide material. Some suitable oxides can include zirconia ($ZrO_2$), and more particularly, zirconia-based materials that can incorporate other elements such as stabilizers or dopants, which can include elements such as yttria (Y), ytterbium (Yb), cerium (Ce), scandium (Sc), samarium (Sm), gadolinium (Gd), lanthanum (La), praseodymium (Pr), neodymium (Nd), and a combination thereof. Particular examples of suitable electrolyte materials can include $Sc_2O_3$-doped $ZrO_2$, $Y_2O_3$-doped $ZrO_2$, $Yb_2O_3$-doped $ZrO_2$, $Sc_2O_3$-doped and $CeO_2$-doped $ZrO_2$, and a combination thereof. The electrolyte layer can also include ceria ($CeO_2$), and more particularly ceria-based materials, such as $Sm_2O_3$-doped $CeO_2$, $Gd_2O_3$-doped $CeO_2$, $Y_2O_3$-doped $CeO_2$, and CaO-doped $CeO_2$. The electrolyte material can also include lanthanide-based materials, such as $LaGaO_3$. The lanthanide-based materials can be doped with particular elements, including but not limited to, Ca, Sr, Ba, Mg, Co, Ni, Fe, and a combination thereof. In particular, the electrolyte material can include a lanthanum strontium manganite (LSM) material. Some exemplary electrolyte materials include $La_{0.8}Sr_{0.2}Ga_{0.8}Mn_{0.2}O_3$, $La_{0.8}Sr_{0.2}Ga_{0.8}Mn_{0.15}Co_{0.5}O_3$, $La_{0.9}Sr_{0.1}Ga_{0.8}Mn_{0.2}O_3$, $LaSrGaO_4$, $LaSrGa_3O_7$, or $La_{0.9}A_{0.1}GaO_3$, wherein A represents one of the elements from the group Sr, Ca, or Ba. According to one particular embodiment, the electrolyte layer 101 can be made of $ZrO_2$ doped with 8 mol % $Y_2O_3$ (i.e., 8 mol % $Y_2O_3$-doped $ZrO_2$). The 8 mol % $Y_2O_3$ can have particular dopants, such as Al and/or Mn to facilitate thermal reaction characteristics and improve the processing characteristics of the electrolyte material. Other exemplary electrolyte materials can include doped yttrium-zirconate (e.g., $Y_2Zr_2O_7$), doped gadolinium-titanate (e.g., $Gd_2Ti_2O_7$) and brownmillerites (e.g., $Ba_2In_2O_6$ or $Ba_2In_2O_5$).

The electrolyte layers 220, 222 can have an average thickness of not greater than about 1 mm, such as not greater than about 500 microns, such as not greater than about 300 microns, not greater than about 200 microns, not greater than about 100 microns, not greater than about 80 microns, not greater than about 50 microns, or even not greater than about 25 microns. Still, the electrolyte layers 220, 222 can have an average thickness of at least about 1 micron, such as at least about 2 microns, at least about 5 microns, at least about 8 microns, or at least about 10 microns. It will be appreciated that the electrolyte layers 220, 222 can have an average thickness within a range between any of the minimum and maximum values noted above.

Figure 3:
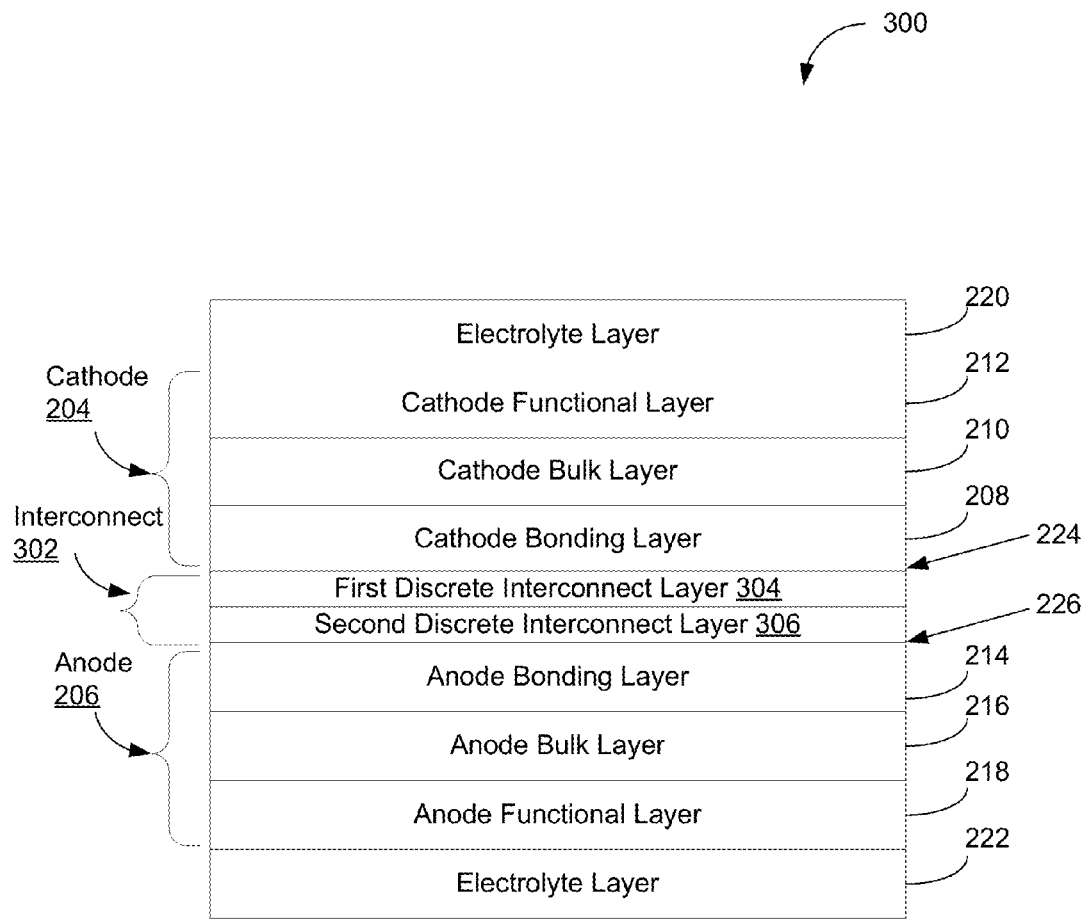
FIG. 3 includes an illustration of an SOFC article including a multiple-layer interconnect in accordance with an embodiment.

Referring to FIG. 3, a particular embodiment of an SOFC article 300 that includes an interconnect 302 is illustrated. In the illustrative, non-limiting embodiment of FIG. 3, the interconnect 302 includes a first discrete interconnect layer 304 and a second discrete interconnect layer 306. The first discrete interconnect layer 304 and the second discrete interconnect layer 306 are disposed between the cathode 204 and the anode 206.

The first discrete interconnect layer 304 may have a first concentration of partially stabilized zirconia at the cathode interface 224, and the second discrete interconnect layer 306 may have a second concentration of partially stabilized zirconia at the anode interface 226. The second concentration of partially stabilized zirconia at the anode interface 226 may be higher than the first concentration of partially stabilized zirconia at the cathode interface 224. In a particular embodiment, the first discrete interconnect layer 304 may include substantially no partially stabilized zirconia. As an illustrative example, the first discrete interconnect layer 304 may include a ceramic interconnect material (e.g., LSTN4.0), and the second discrete interconnect layer 306 may include a ceramic interconnect material (e.g., LSTN4.0) and partially stabilized zirconia.

The first discrete interconnect layer 304 may have a thickness that is less than the thickness of the interconnect 202 of FIG. 2. Further, the second discrete interconnect layer 306 may have a thickness that is less than the thickness of the interconnect 202 of FIG. 2. In a particular embodiment, a total combined thickness of the first discrete interconnect layer 304 and the second discrete interconnect layer 306 may be about the same as the thickness of the interconnect 202 of FIG. 2. In one embodiment, the thickness of the first discrete interconnect layer 304 may be about the same as the thickness of the second discrete interconnect layer 306. Alternatively, the thickness of the first discrete interconnect layer 304 may be different than the thickness of the second discrete interconnect layer 306. As an illustrative, non-limiting example, the second discrete interconnect layer 306 may include a ceramic interconnect material (e.g., LSTN4.0) and partially stabilized zirconia and may be thicker than the first discrete interconnect layer 304.

In a particular embodiment, the first discrete interconnect layer 304 may have an average thickness that is not greater than about 50 μm, such as not greater than about 45 μm, not greater than about 40 μm, not greater than about 35 μm, not greater than about 30 μm, or not greater than about 25 μm. The first discrete interconnect layer 304 may have an average thickness that is not less than about 2 μm, not less than about 3 μm, not less than about 4 μm, or not less than about 5 μm. It will be appreciated that the first discrete interconnect layer 304 can have an average thickness within a range including any of the minimum and maximum values noted above.

The second discrete interconnect layer 306 may have an average thickness that is not greater than about 50 μm, such as not greater than about 45 μm, not greater than about 40 μm, not greater than about 35 μm, not greater than about 30 μm, or not greater than about 25 μm. The second discrete interconnect layer 306 may have an average thickness that is not less than about 2 μm, not less than about 3 μm, not less than about 4 μm, or not less than about 5 μm. It will be appreciated that the second discrete interconnect layer 306 can have an average thickness within a range including any of the minimum and maximum values noted above.

In a particular embodiment, the porosity of the first discrete interconnect layer 304 may be not less than about 0.05 vol %, such as not less than about 0.1 vol %, not less than about 0.2 vol %, or not less than about 0.5 vol %. The porosity of the first discrete interconnect layer 304 may be not greater than about 5 vol %, such as not greater than about 4 vol %, not greater than about 3 vol %, or not greater than about 2 vol %. It will be appreciated that the first discrete interconnect layer 304 can have a porosity within a range including any of the minimum and maximum values noted above.

In a particular embodiment, the porosity of the second discrete interconnect layer 306 may be not less than about 0.05 vol %, such as not less than about 0.1 vol %, not less than about 0.2 vol %, or not less than about 0.5 vol %. The porosity of the second discrete interconnect layer 306 may be not greater than about 5 vol %, such as not greater than about 4 vol %, not greater than about 3 vol %, or not greater than about 2 vol %. It will be appreciated that the second discrete interconnect layer 306 can have a porosity within a range including any of the minimum and maximum values noted above.

In a particular embodiment, the second discrete interconnect layer 306 may have a volume conductivity in a forming gas atmosphere comprising about 4 vol % $H_2$ and about 96 vol % $N_2$ of not less than about 1 S/cm (e.g., at a temperature of about 800° C., about 900° C., or about 1000° C.), such as not less than about 2 S/cm, not less than about 3 S/cm, not less than about 4 S/cm, or not less than about 5 S/cm. It will be appreciated that the first discrete interconnect layer 304 can have a volume conductivity in a forming gas atmosphere within a range including any of the minimum and maximum values noted above.

The second discrete interconnect layer 306 may have a volume conductivity in a forming gas atmosphere comprising about 4 vol % $H_2$ and about 96 vol % $N_2$ of not greater than about 25 S/cm, such as not greater than about 20 S/cm, or not greater than about 15 S/cm. It will be appreciated that the second discrete interconnect layer 306 can have a volume conductivity in a forming gas atmosphere within a range including any of the minimum and maximum values noted above.

EXAMPLES

As used herein, the term "3Y" will be used to refer to a partially stabilized zirconia that includes $ZrO_2$, with about 3.0 mol % $Y_2O_3$. As an illustrative example, the term "LST28-3Y5" will be used to refer to a material that includes about 5 vol % partially stabilized zirconia (i.e., $ZrO_2$ that is partially stabilized with about 3.0 mol % $Y_2O_3$) and about 95 vol % LST28 ceramic interconnect material. The term "LST28-3Y10" will be used to refer to a material that includes about 10 vol % partially stabilized zirconia (i.e., $ZrO_2$ that is partially stabilized with about 3.0 mol % $Y_2O_3$) and about 90 vol % LST28. The term "LST28-3Y15" will be used to refer to a material that includes about 15 vol % partially stabilized zirconia (i.e., $ZrO_2$ that is partially stabilized with about 3.0 mol % $Y_2O_3$) and about 85 vol % LST28. The term "LST28-3Y20" will be used to refer to a material that includes about 20 vol % partially stabilized zirconia (i.e., $ZrO_2$ that is partially stabilized with about 3.0 mol % $Y_2O_3$) and about 80 vol % LST28.

The term "LSTN4.0-3Y5" will be used to refer to a material that includes about 5 vol % partially stabilized zirconia (i.e., $ZrO_2$ that is partially stabilized with about 3.0 mol % $Y_2O_3$) and about 95 vol % LSTN4.0 ceramic interconnect material. The term "LSTN4.0-3Y10" will be used to refer to a material that includes about 10 vol % partially stabilized zirconia (i.e., $ZrO_2$ that is partially stabilized with about 3.0 mol % $Y_2O_3$) and about 90 vol % LSTN4.0. The term "LSTN4.0-3Y15" will be used to refer to a material that includes about 15 vol % partially stabilized zirconia (i.e., $ZrO_2$ that is partially stabilized with about 3.0 mol % $Y_2O_3$) and about 85 vol % LSTN4.0. The term "LSTN4.0-3Y20" will be used to refer to a material that includes about 20 vol % partially stabilized zirconia (i.e., $ZrO_2$ that is partially stabilized with about 3.0 mol % $Y_2O_3$) and about 80 vol % LSTN4.0.

The term "LSTN6.0-3Y5" will be used to refer to a material that includes about 5 vol % partially stabilized zirconia (i.e., $ZrO_2$ that is partially stabilized with about 3.0 mol % $Y_2O_3$) and about 95 vol % LSTN6.0 ceramic interconnect material. The term "LSTN6.0-3Y10" will be used to refer to a material that includes about 10 vol % partially stabilized zirconia (i.e., $ZrO_2$ that is partially stabilized with about 3.0 mol % $Y_2O_3$) and about 90 vol % LSTN6.0. The term "LSTN6.0-3Y15" will be used to refer to a material that includes about 15 vol % partially stabilized zirconia (i.e., $ZrO_2$ that is partially stabilized with about 3.0 mol % $Y_2O_3$) and about 85 vol % LSTN6.0. The term "LSTN6.0-3Y20" will be used to refer to a material that includes about 20 vol % partially stabilized zirconia (i.e., $ZrO_2$ that is partially stabilized with about 3.0 mol % $Y_2O_3$) and about 80 vol % LSTN6.0.

Example 1

Exemplary interconnect materials were formed from a ceramic interconnect material and partially stabilized zirconia. The shrinkage rate (dL/dT) for each exemplary interconnect material including partially stabilized zirconia was measured by dilatometry for comparison with interconnect materials without partially stabilized zirconia. Specifically, the shrinkage rates of LST28-3Y5, LST28-3Y10, LST28-3Y15, and LST28-3Y20 were measured and compared to the shrinkage rate of LST28. The shrinkage rates of LSTN4.0-3Y5, LSTN4.0-3Y10, LSTN4.0-3Y15, and LSTN4.0-3Y20 were measured and compared to the shrinkage rate of LSTN4.0. The shrinkage rates of LSTN6.0-3Y5, LSTN6.0-3Y10, LSTN6.0-3Y15, and LSTN6.0-3Y20 were measured and compared to the shrinkage rate of LSTN6.0. The peak temperature of the dL/dT curve was determined for each of the exemplary interconnect materials.

Figure 4:
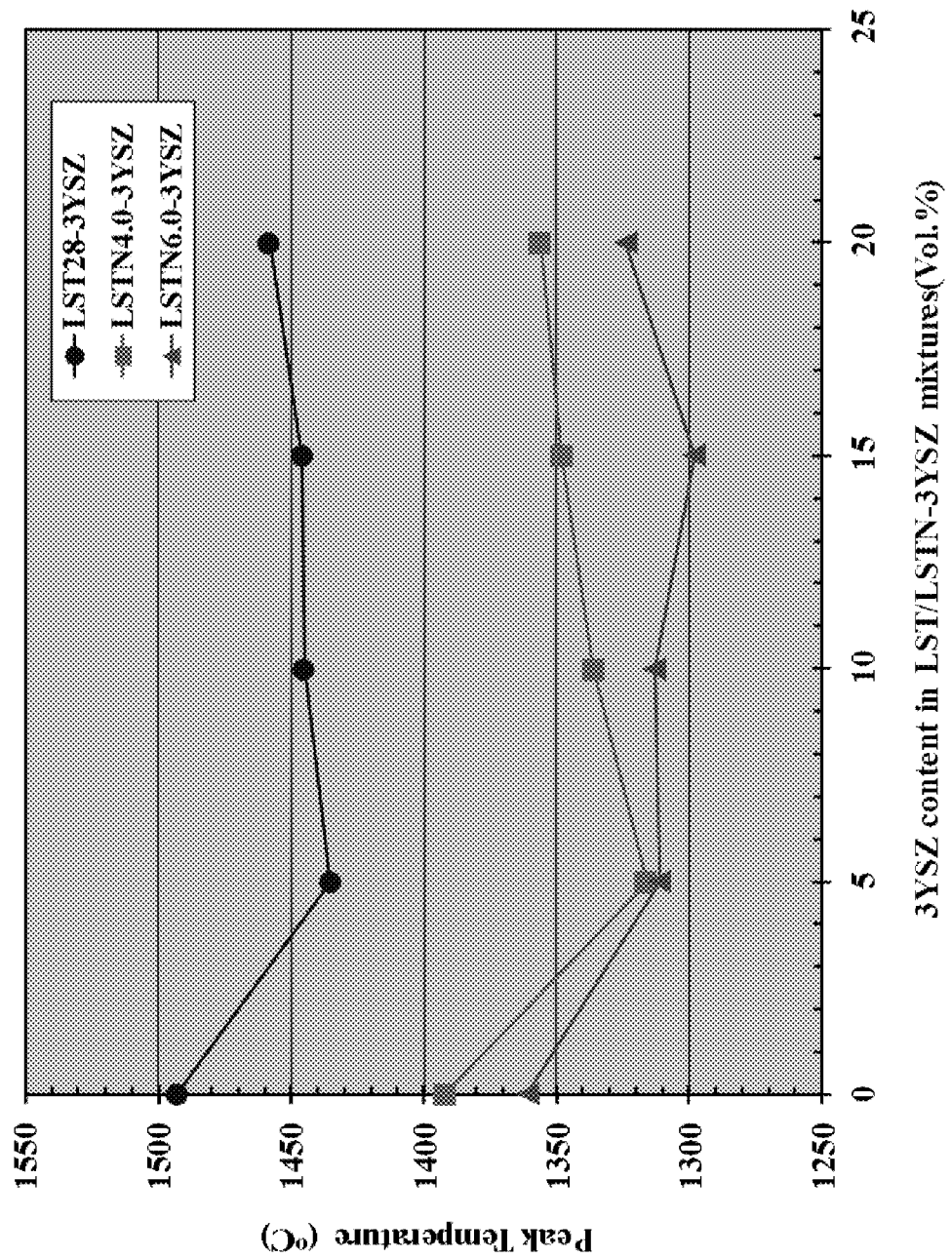
FIG. 4 illustrates the peak temperature of exemplary interconnect materials that include a ceramic interconnect material and partially stabilized zirconia according to the volume percentage of partially stabilized zirconia, as measured by dilatometry.

FIG. 4 illustrates the peak temperature of exemplary interconnect materials that include a ceramic interconnect material and partially stabilized zirconia according to the volume percentage of partially stabilized zirconia, as measured by dilatometry. FIG. 4 illustrates that the addition of partially stabilized zirconia to LST28, LSTN4.0, and LSTN6.0 lowered the peak temperature, indicating improved sinterability.

For example, the peak temperature for LST28 was reduced from about 1493° C. to about 1435° C. for LST28-3Y5, the peak temperature for LSTN4.0 was reduced from about 1392° C. to about 1316° C. for LSTN4.0-3Y5, and the peak temperature for LSTN6.0 was reduced from about 1361° C. to about 1311° C. for LSTN6.0-3Y5.

Example 2

Figure 5:
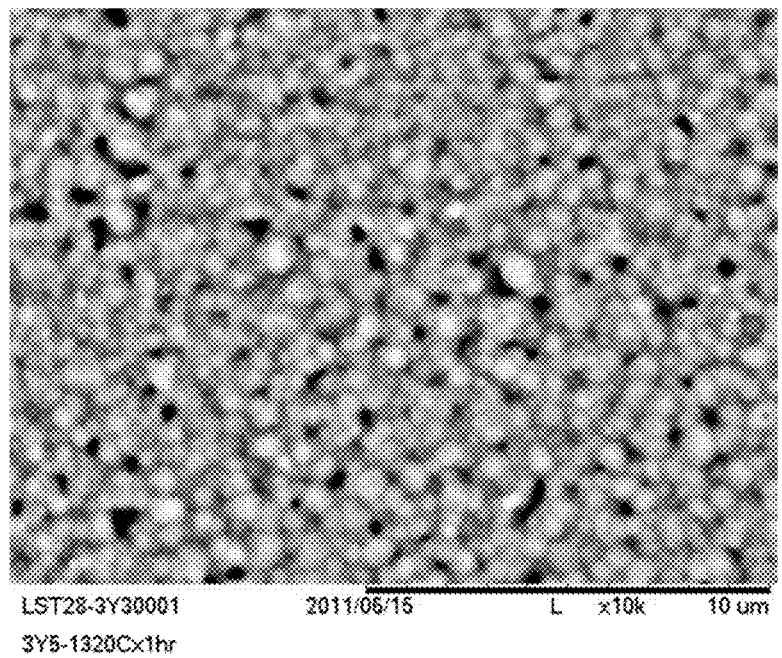
FIG. 5 includes an SEM image of an exemplary interconnect material (LST28-3Y5) that includes a ceramic interconnect material and partially stabilized zirconia, after a free sintering operation performed at a temperature of about 1320° C. for a time period of about one hour.

LST28, available from American Elements (Los Angeles, Calif.), and partially stabilized zirconia (ZrO2 that is partially stabilized with about 3.0 mol % $Y_2O_3$), available from Tosoh USA, were ball milled to form a mixture. The partially stabilized zirconia was about 5 vol % of the total volume of the mixture. The resulting LST28-3Y5 mixture was free sintered at a temperature of about 1320° C. for a time period of about one hour. FIG. 5 is an SEM image at 10 k magnification after the free sintering operation.

Figure 6:
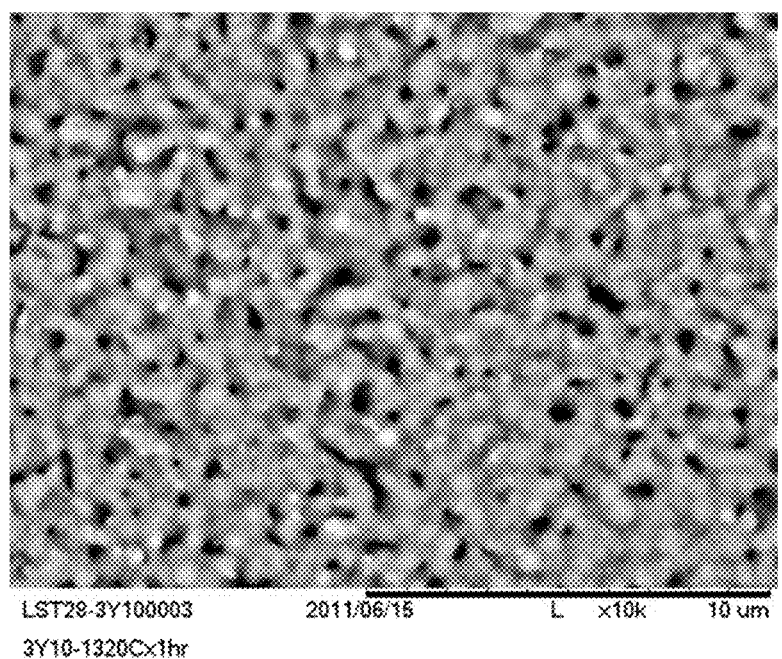
FIG. 6 includes an SEM image of an exemplary interconnect material (LST28-3Y10) that includes a ceramic interconnect material and partially stabilized zirconia, after a free sintering operation performed at a temperature of about 1320° C. for a time period of about one hour.

LST28 and partially stabilized zirconia ($ZrO_2$ that is partially stabilized with about 3.0 mol % $Y_2O_3$) were ball milled to form a mixture. The partially stabilized zirconia was about 10 vol % of the total volume of the mixture. The resulting LST28-3Y10 mixture was free sintered at a temperature of about 1320° C. for a time period of about one hour. FIG. 6 is an SEM image at 10 k magnification after the free sintering operation.

Figure 7:
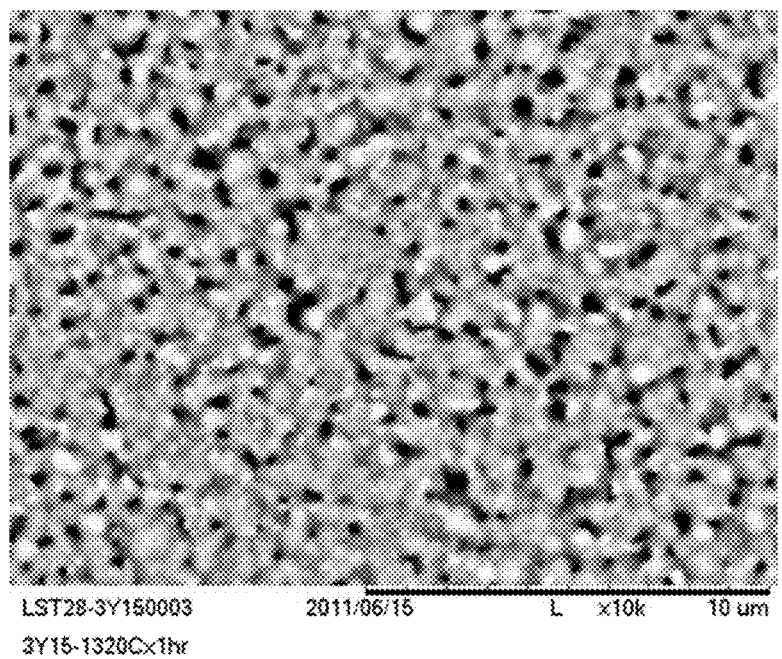
FIG. 7 includes an SEM image of an exemplary interconnect material (LST28-3Y15) that includes a ceramic interconnect material and partially stabilized zirconia, after a free sintering operation performed at a temperature of about 1320° C. for a time period of about one hour.

LST28 and partially stabilized zirconia (ZrO2 that is partially stabilized with about 3.0 mol % $Y_2O_3$) were ball milled to form a mixture. The partially stabilized zirconia was about 15 vol % of the total volume of the mixture. The resulting LST28-3Y15 mixture was free sintered at a temperature of about 1320° C. for a time period of about one hour. FIG. 7 is an SEM image at 10 k magnification after the free sintering operation.

Figure 8:
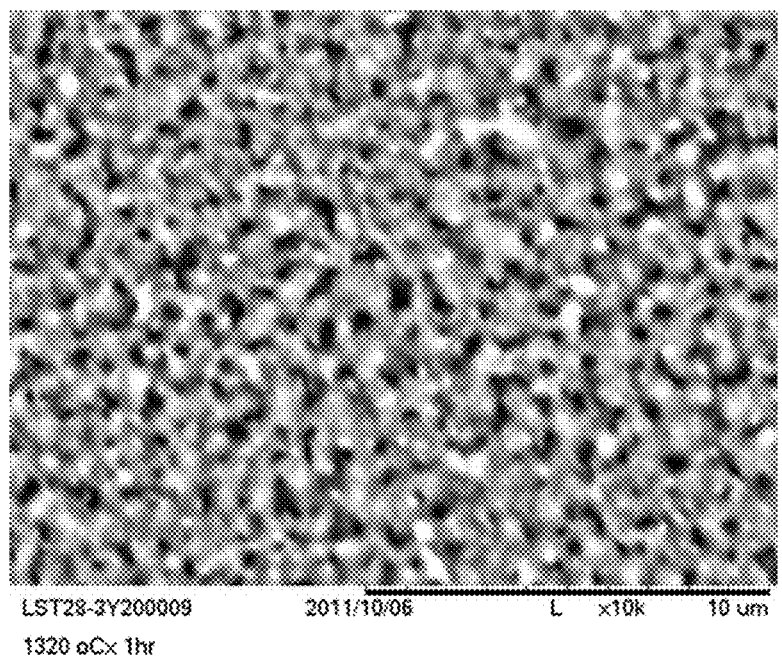
FIG. 8 includes an SEM image of an exemplary interconnect material (LST28-3Y20) that includes a ceramic interconnect material and partially stabilized zirconia, after a free sintering operation performed at a temperature of about 1320° C. for a time period of about one hour.

LST28 and partially stabilized zirconia (ZrO2 that is partially stabilized with about 3.0 mol % $Y_2O_3$) were ball milled to form a mixture. The partially stabilized zirconia was about 20 vol % of the total volume of the mixture. The resulting LST28-3Y20 mixture was free sintered at a temperature of about 1320° C. for a time period of about one hour. FIG. 8 is an SEM image at 10 k magnification after the free sintering operation.

The relative density of each of the exemplary interconnect materials (LST28-3Y5, LST28-3Y10, LST28-3Y15, and LST28-3Y20) was determined after the free sintering operation. The density of each of the exemplary interconnect materials after free sintering was measured using the Archimedes method. The theoretical density of each of the exemplary interconnect materials was determined based on the mix law using the theoretical density of 3YSZ, LST28, LSTN4.0 and LSTN6.0. The relative density percentage of each of the exemplary interconnect materials was determined by dividing the measured density by the theoretical density.

For example, the relative density of LST28-3Y5 was determined to be about 87.8% of theoretical density after the free sintering operation. The relative density of LST28-3Y10 was determined to be about 79.3%, the relative density of LST28-3Y15 was determined to be about 77.1%, and the relative density of LST28-3Y20 was determined to be 75%.

The biaxial flexure strength of each of the exemplary interconnect materials (LST28-3Y5, LST28-3Y10, LST28-3Y15, and LST28-3Y20) was determined after the free sintering operation. The biaxial flexure strength of each of the exemplary interconnect materials was measured with a ring on ring technique (ASTM-C1499-04) with a support ring (diameter=20 mm) and a load ring (diameter=9.5 mm) on the disk samples (diameter=25.4 mm and thickness=2 mm) after free sintering. The maximum load to break the disk sample with the sample dimension was used to determine the biaxial flexure strength of the exemplary interconnect materials.

Figure 9:
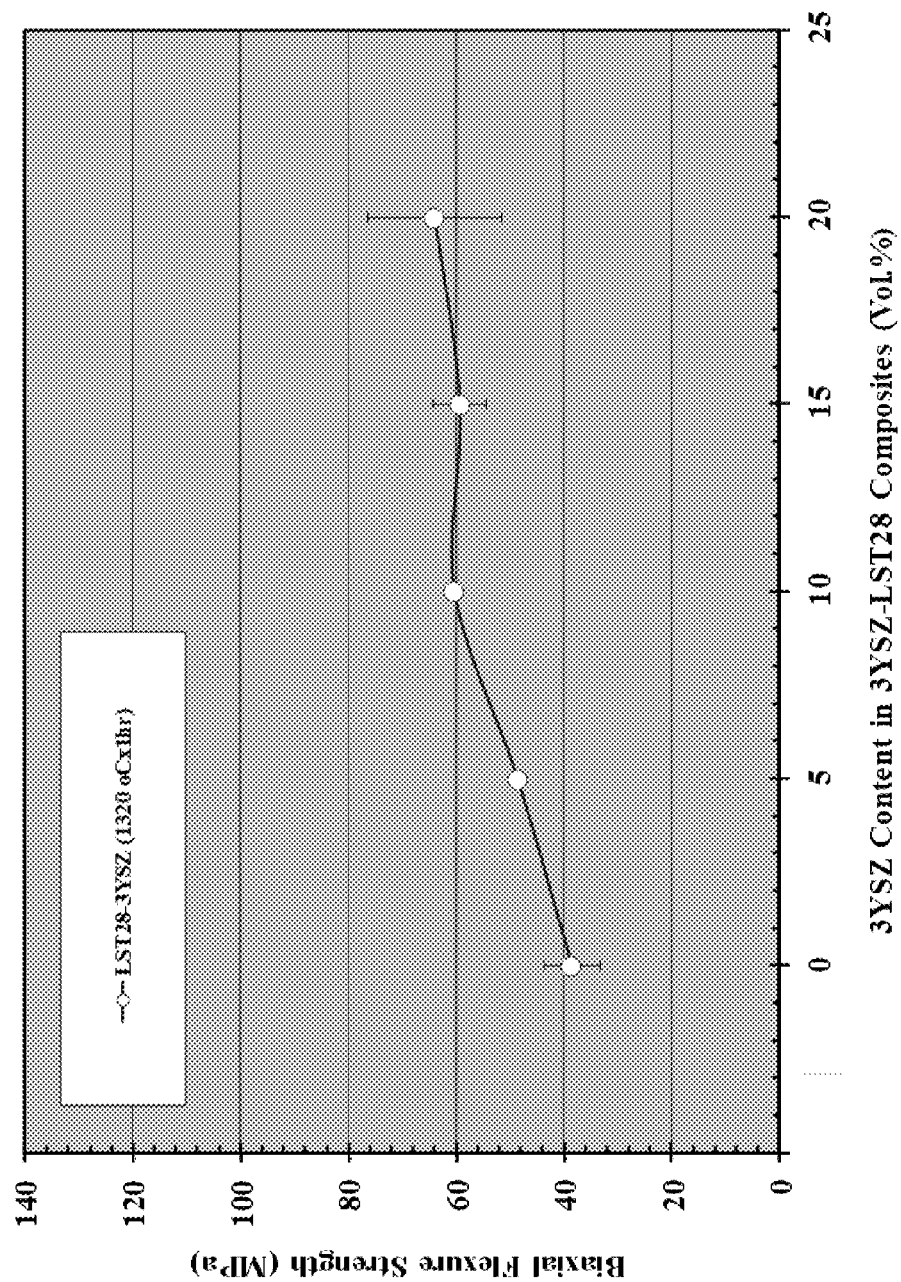
FIG. 9 illustrates the biaxial flexure strength (MPa) of exemplary interconnect materials that include a ceramic interconnect material and partially stabilized zirconia according to the volume percentage of partially stabilized zirconia, as measured after a free sintering operation performed at a temperature of about 1320° C. for a time period of about one hour.

FIG. 9 illustrates the biaxial flexure strength (MPa) of each of the exemplary interconnect materials (LST28-3Y5, LST28-3Y10, LST28-3Y15, and LST28-3Y20).

For example, the biaxial flexure strength of LST28-3Y5 was determined to be about 48.6 MPa after the free sintering operation, compared to a biaxial flexure strength of 38.5 MPa for LST28. The biaxial flexure strength of LST28-3Y10 was determined to be about 60.3 MPa, the biaxial flexure strength of LST28-3Y15 was determined to be about 59.3 MPa, and the biaxial flexure strength of LST28-3Y20 was determined to be 63.9 MPa.

Example 3

Figure 10:
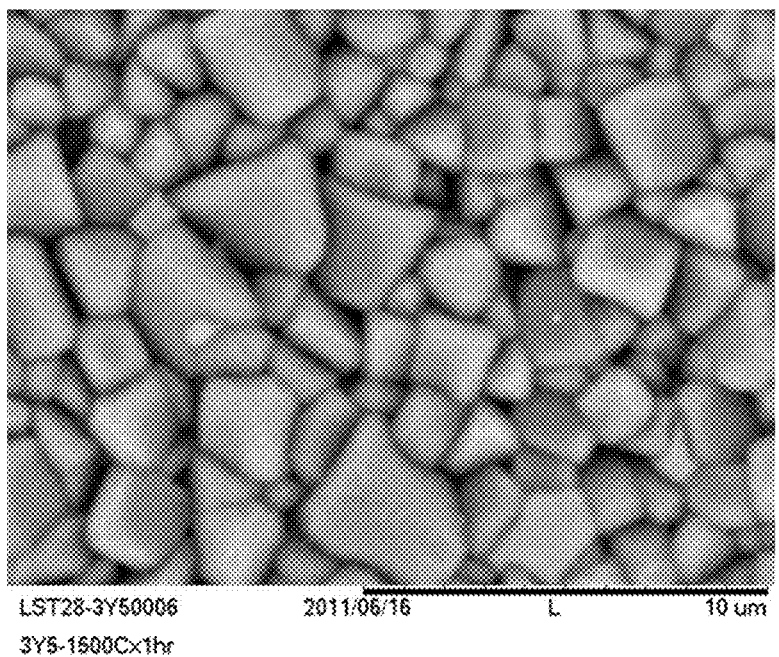
FIG. 10 includes an SEM image of an exemplary interconnect material (LST28-3Y5) that includes a ceramic interconnect material and partially stabilized zirconia, after a free sintering operation performed at a temperature of about 1500° C. for a time period of about one hour.

LST28, available from American Elements (Los Angeles, Calif.), and partially stabilized zirconia (ZrO2 that is partially stabilized with about 3.0 mol % $Y_2O_3$), available from Tosoh USA, were ball milled to form a mixture. The partially stabilized zirconia was about 5 vol % of the total volume of the mixture. The resulting LST28-3Y5 mixture was free sintered at a temperature of about 1500° C. for a time period of about one hour. FIG. 10 is an SEM image at 10 k magnification after the free sintering operation.

Figure 11:
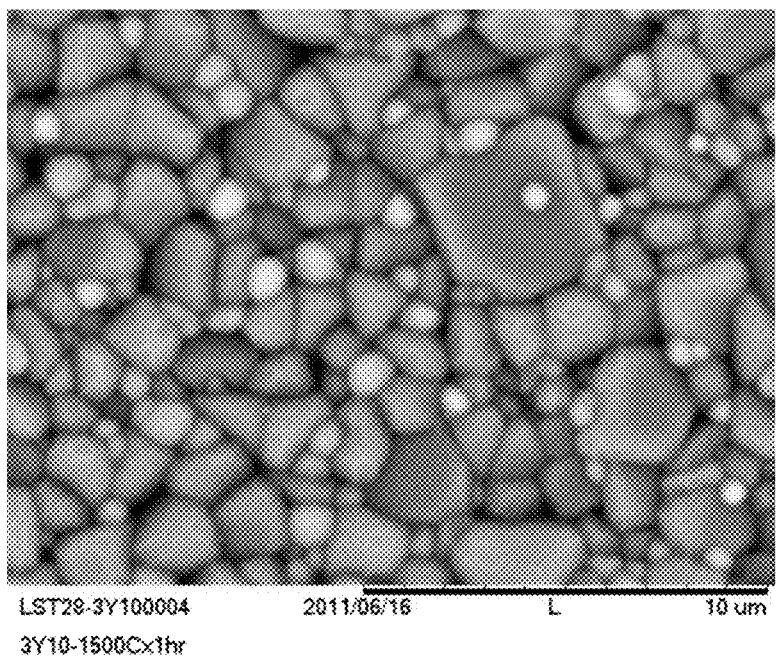
FIG. 11 includes an SEM image of an exemplary interconnect material (LST28-3Y10) that includes a ceramic interconnect material and partially stabilized zirconia, after a free sintering operation performed at a temperature of about 1500° C. for a time period of about one hour.

LST28 and partially stabilized zirconia (ZrO2 that is partially stabilized with about 3.0 mol % $Y_2O_3$) were ball milled to form a mixture. The partially stabilized zirconia was about 10 vol % of the total volume of the mixture. The resulting LST28-3Y10 mixture was free sintered at a temperature of about 1500° C. for a time period of about one hour. FIG. 11 is an SEM image at 10 k magnification after the free sintering operation.

Figure 12:
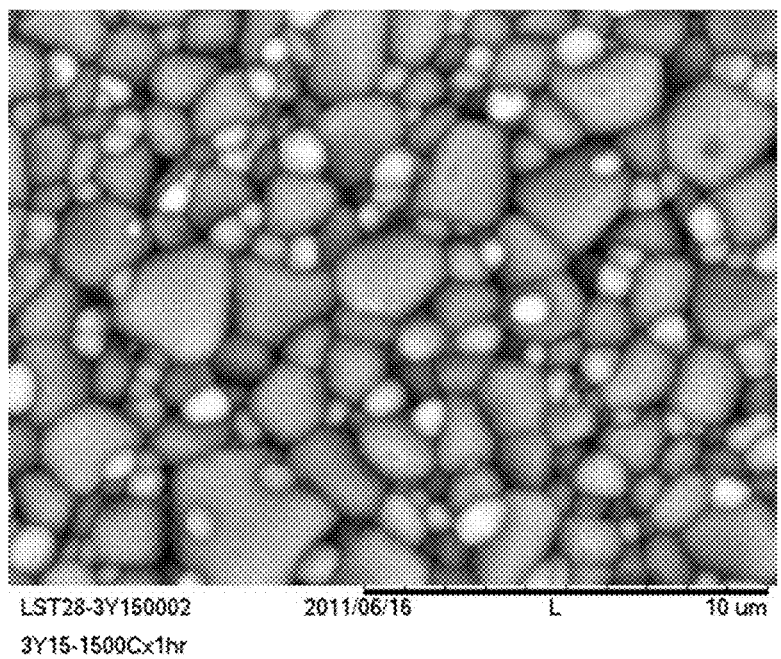
FIG. 12 includes an SEM image of an exemplary interconnect material (LST28-3Y15) that includes a ceramic interconnect material and partially stabilized zirconia, after a free sintering operation performed at a temperature of about 1500° C. for a time period of about one hour.

LST28 and partially stabilized zirconia (ZrO2 that is partially stabilized with about 3.0 mol % $Y_2O_3$) were ball milled to form a mixture. The partially stabilized zirconia was about 15 vol % of the total volume of the mixture. The resulting LST28-3Y15 mixture was free sintered at a temperature of about 1500° C. for a time period of about one hour. FIG. 12 is an SEM image at 10 k magnification after the free sintering operation.

Figure 13:
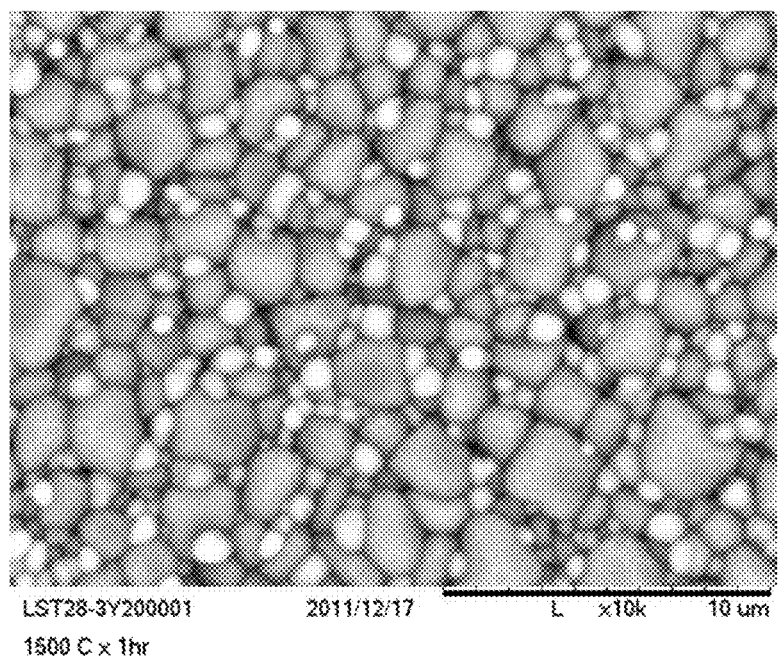
FIG. 13 includes an SEM image of an exemplary interconnect material (LST28-3Y20) that includes a ceramic interconnect material and partially stabilized zirconia, after a free sintering operation performed at a temperature of about 1500° C. for a time period of about one hour.

LST28 and partially stabilized zirconia ($ZrO_2$ that is partially stabilized with about 3.0 mol % $Y_2O_3$) were ball milled to form a mixture. The partially stabilized zirconia was about 20 vol % of the total volume of the mixture. The resulting LST28-3Y20 mixture was free sintered at a temperature of about 1500° C. for a time period of about one hour. FIG. 13 is an SEM image at 10 k magnification after the free sintering operation.

The relative density of each of the exemplary interconnect materials (LST28-3Y5, LST28-3Y10, LST28-3Y15, and LST28-3Y20) was determined after the free sintering operation. The relative density was determined as described in Example 2.

For example, the relative density of LST28-3Y5 was determined to be about 101.7% of theoretical density after the free sintering operation. The relative density of LST28-3Y10 was determined to be about 101.6%, the relative density of LST28-3Y15 was determined to be about 101.3%, and the relative density of LST28-3Y20 was determined to be about 101.4%.

The biaxial flexure strength of each of the exemplary interconnect materials (LST28-3Y5, LST28-3Y10, LST28-3Y15, and LST28-3Y20) was measured after the free sintering operation. The biaxial flexure strength was determined as described in Example 2.

Figure 14:
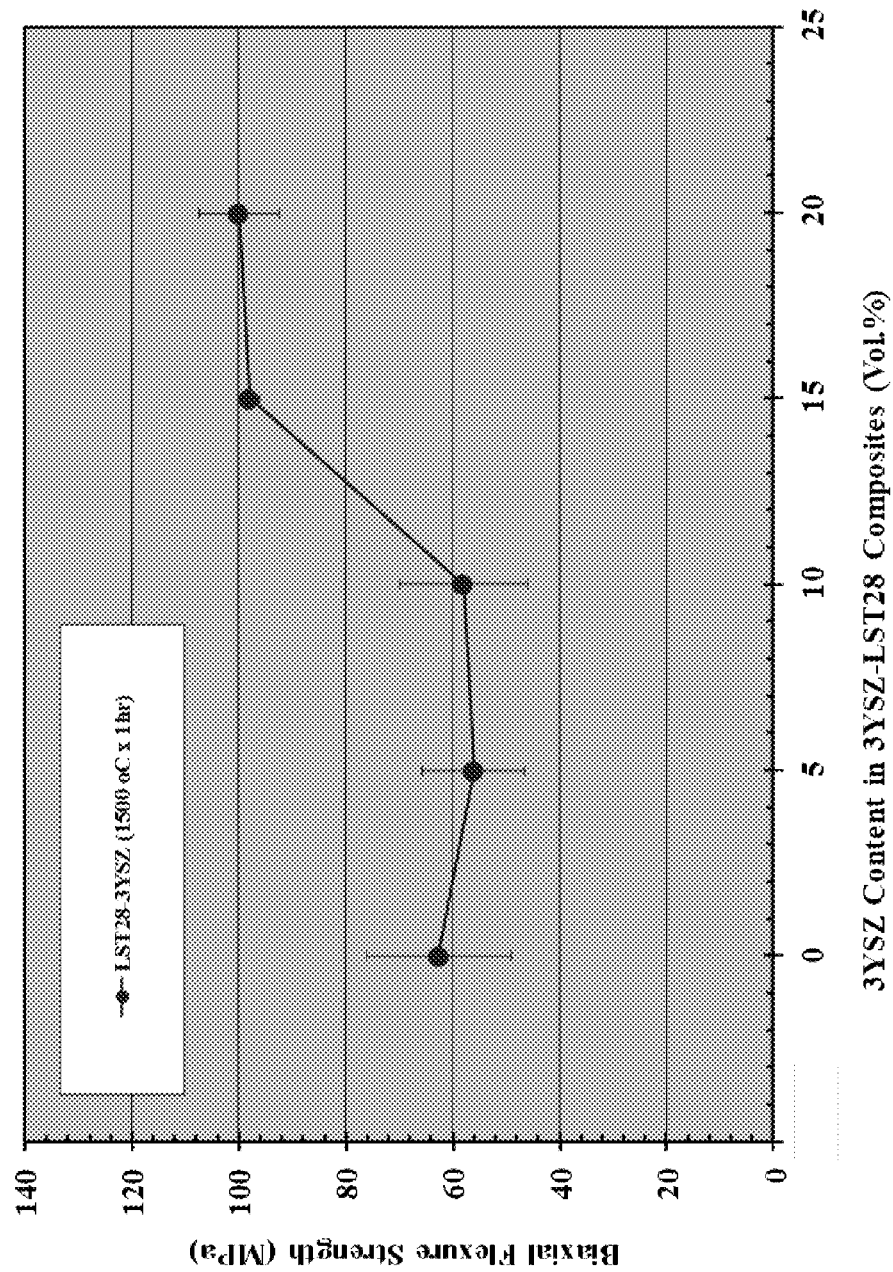
FIG. 14 illustrates the biaxial flexure strength (MPa) of exemplary interconnect materials that include a ceramic interconnect material and partially stabilized zirconia according to the volume percentage of partially stabilized zirconia, as measured after a free sintering operation performed at a temperature of about 1500° C. for a time period of about one hour.

FIG. 14 illustrates the biaxial flexure strength (MPa) of each of the exemplary interconnect materials (LST28-3Y5, LST28-3Y10, LST28-3Y15, and LST28-3Y20).

For example, the biaxial flexure strength of LST28-3Y5 was determined to be about 56.03 MPa after the free sintering operation, compared to a biaxial flexure strength of 62.59 MPa for LST28. The biaxial flexure strength of LST28-3Y10 was determined to be about 57.96 MPa, the biaxial flexure strength of LST28-3Y15 was determined to be about 98.02 MPa, and the biaxial flexure strength of LST28-3Y20 was determined to be 99.97 MPa.

Example 4

Figure 15:
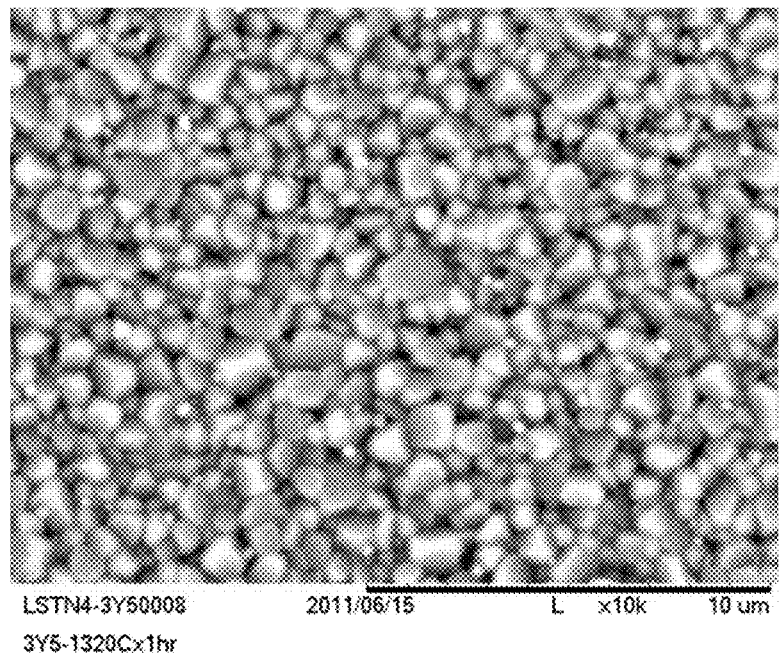
FIG. 15 includes an SEM image of an exemplary interconnect material (LSTN4.0-3Y5) that includes a ceramic interconnect material and partially stabilized zirconia, after a free sintering operation performed at a temperature of about 1320° C. for a time period of about one hour.

LSTN4.0, available from Saint-Gobain Corp., and partially stabilized zirconia (ZrO2 that is partially stabilized with about 3.0 mol % $Y_2O_3$), available from Tosoh USA, were ball milled to form a mixture. The partially stabilized zirconia was about 5 vol % of the total volume of the mixture. The resulting LSTN4.0-3Y5 mixture was free sintered at a temperature of about 1320° C. for a time period of about one hour. FIG. 15 is an SEM image at 10 k magnification after the free sintering operation.

Figure 16:
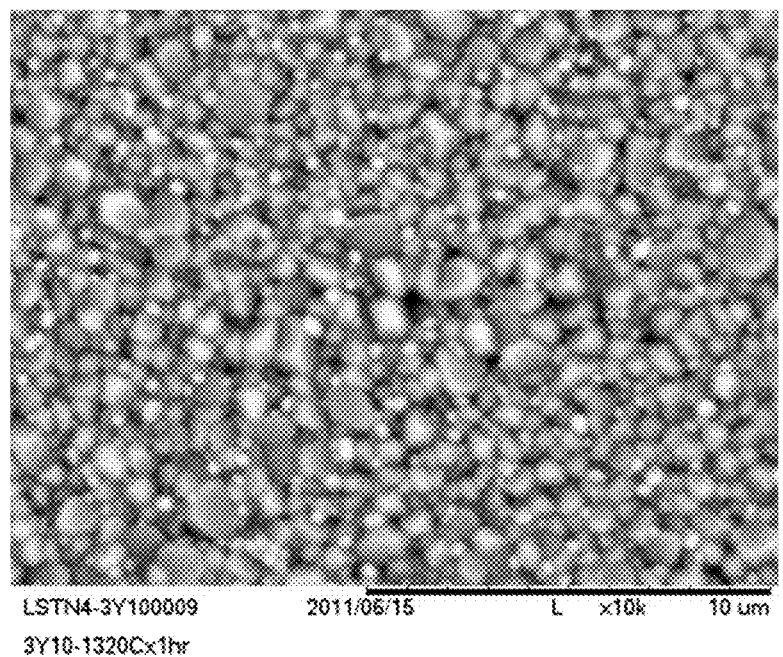
FIG. 16 includes an SEM image of an exemplary interconnect material (LSTN4.0-3Y10) that includes a ceramic interconnect material and partially stabilized zirconia, after a free sintering operation performed at a temperature of about 1320° C. for a time period of about one hour.

LSTN4.0 and partially stabilized zirconia (ZrO2 that is partially stabilized with about 3.0 mol % $Y_2O_3$) were ball milled to form a mixture. The partially stabilized zirconia was about 10 vol % of the total volume of the mixture. The resulting LSTN4.0-3Y10 mixture was free sintered at a temperature of about 1320° C. for a time period of about one hour. FIG. 16 is an SEM image at 10 k magnification after the free sintering operation.

Figure 17:
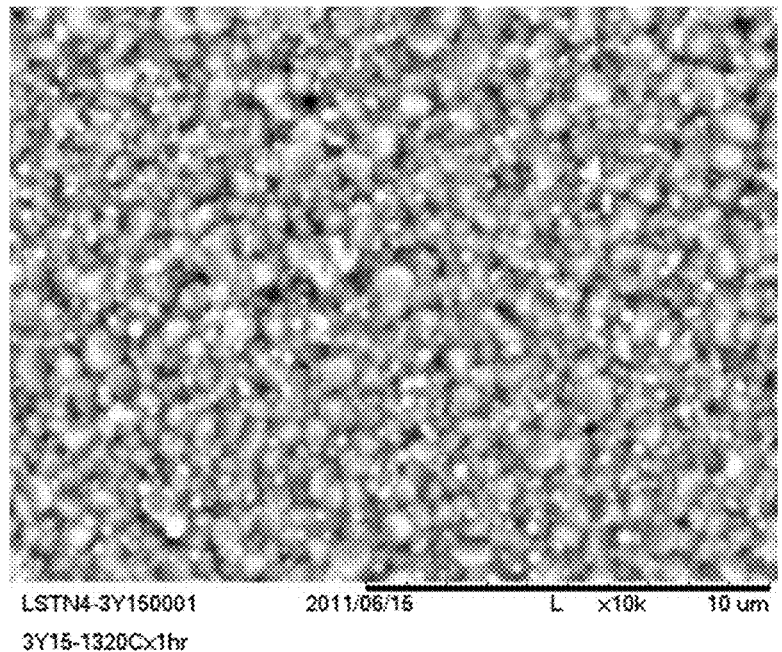
FIG. 17 includes an SEM image of an exemplary interconnect material (LSTN4.0-3Y15) that includes a ceramic interconnect material and partially stabilized zirconia, after a free sintering operation performed at a temperature of about 1320° C. for a time period of about one hour.

LSTN4.0 and partially stabilized zirconia (ZrO2 that is partially stabilized with about 3.0 mol % $Y_2O_3$) were ball milled to form a mixture. The partially stabilized zirconia was about 15 vol % of the total volume of the mixture. The resulting LSTN4.0-3Y15 mixture was free sintered at a temperature of about 1320° C. for a time period of about one hour. FIG. 17 is an SEM image at 10 k magnification after the free sintering operation.

Figure 18:
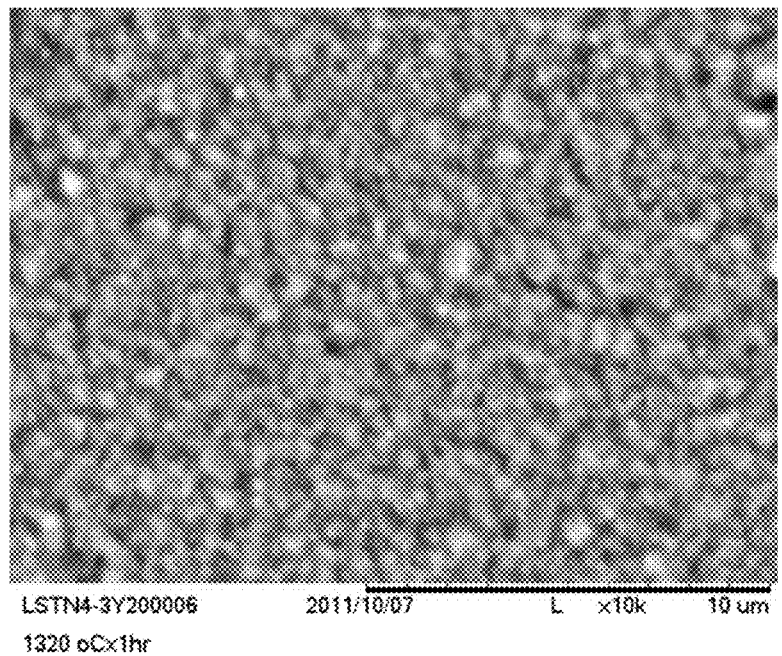
FIG. 18 includes an SEM image of an exemplary interconnect material (LSTN4.0-3Y20) that includes a ceramic interconnect material and partially stabilized zirconia, after a free sintering operation performed at a temperature of about 1320° C. for a time period of about one hour.

LSTN4.0 and partially stabilized zirconia (ZrO2 that is partially stabilized with about 3.0 mol % $Y_2O_3$) were ball milled to form a mixture. The partially stabilized zirconia was about 20 vol % of the total volume of the mixture. The resulting LSTN4.0-3Y20 mixture was free sintered at a temperature of about 1320° C. for a time period of about one hour. FIG. 18 is an SEM image at 10 k magnification after the free sintering operation.

The relative density of each of the exemplary interconnect materials (LSTN4.0-3Y5, LSTN4.0-3Y10, LSTN4.0-3Y15, and LSTN4.0-3Y20) was determined after the free sintering operation. The relative density was determined as described in Example 2.

For example, the relative density of LSTN4.0-3Y5 was determined to be about 102.9% of theoretical density after the free sintering operation. The relative density of LSTN4.0-3Y10 was determined to be about 103%, the relative density of LSTN4.0-3Y15 was determined to be about 102.5%, and the relative density of LSTN4.0-3Y20 was determined to be about 102.2%.

The biaxial flexure strength of each of the exemplary interconnect materials (LSTN4.0-3Y5, LSTN4.0-3Y10, LSTN4.0-3Y15, and LSTN4.0-3Y20) was measured after the free sintering operation. The biaxial flexure strength testing was performed as described in Example 2.

Figure 19:
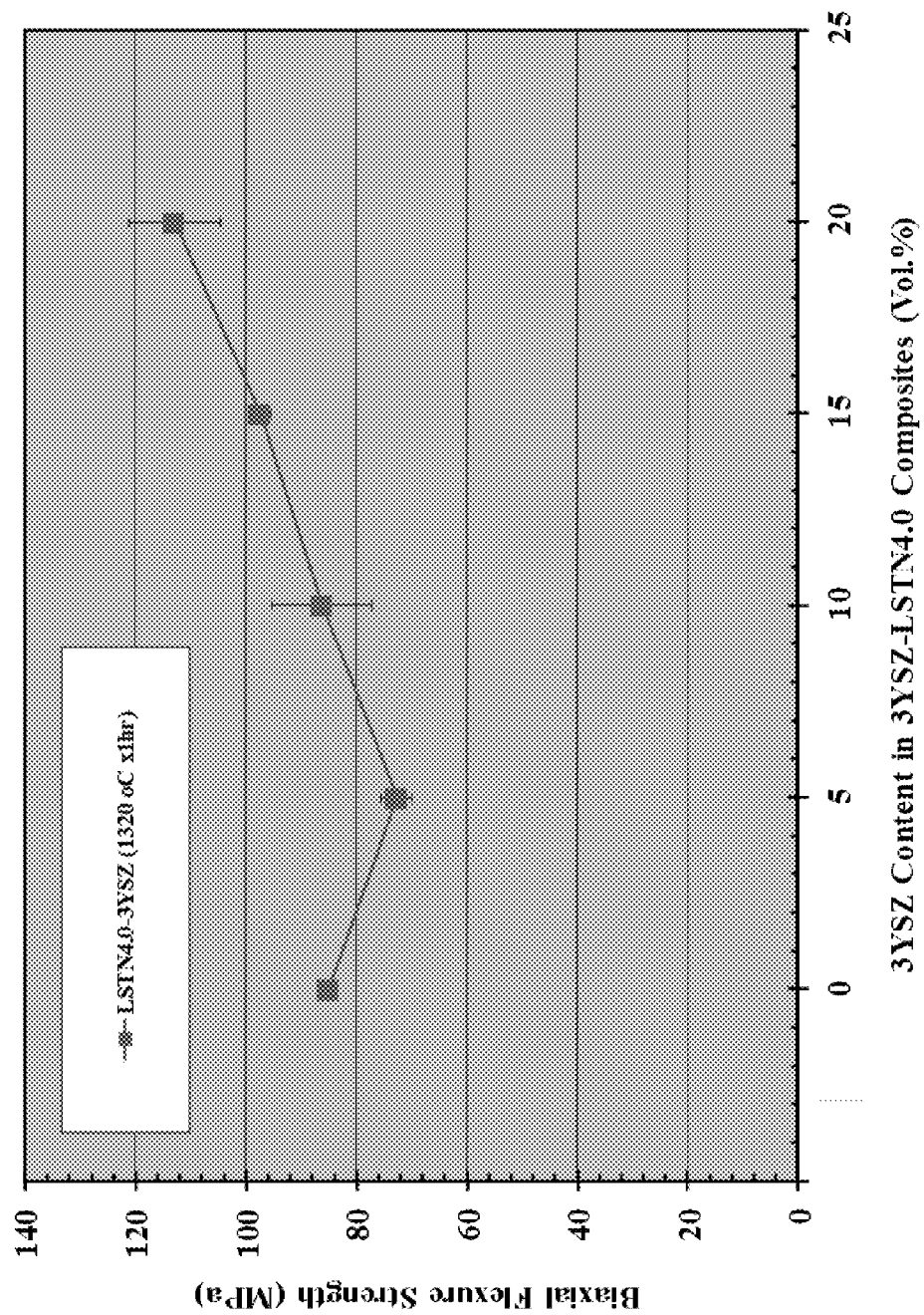
FIG. 19 illustrates the biaxial flexure strength (MPa) of exemplary interconnect materials that include a ceramic interconnect material and partially stabilized zirconia according to the volume percentage of partially stabilized zirconia, as measured after a free sintering operation performed at a temperature of about 1320° C. for a time period of about one hour.

FIG. 19 illustrates the biaxial flexure strength (MPa) of each of the exemplary interconnect materials (LSTN4.0-3Y5, LSTN4.0-3Y10, LSTN4.0-3Y15, and LSTN4.0-3Y20).

For example, the biaxial flexure strength of LSTN4.0-3Y5 was determined to be about 72.7 MPa after the free sintering operation, compared to a biaxial flexure strength of 85.09 MPa for LSTN4.0. The biaxial flexure strength of LSTN4.0-3Y10 was determined to be about 86.21 MPa, the biaxial flexure strength of LSTN4.0-3Y15 was determined to be about 97.51 MPa, and the biaxial flexure strength of LSTN4.0-3Y20 was determined to be 113.02 MPa.

Example 5

Figure 20:
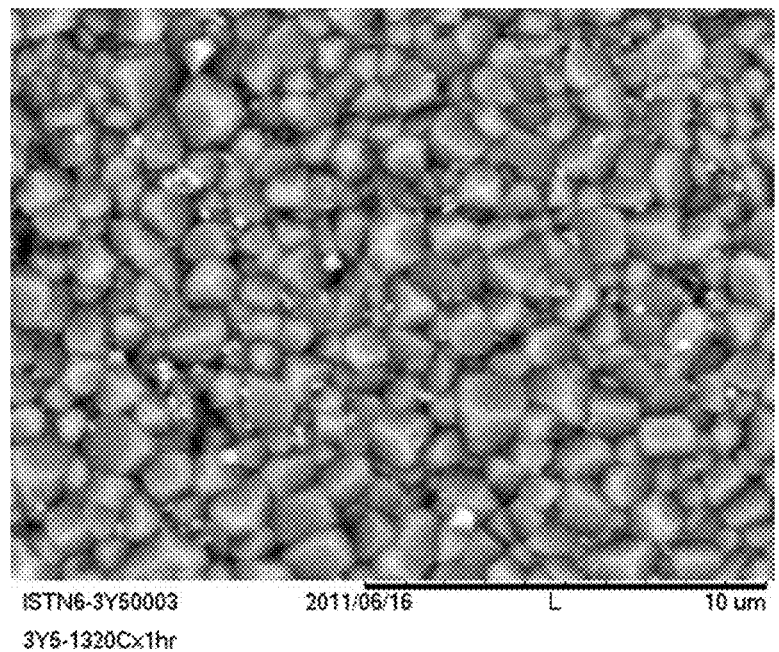
FIG. 20 includes an SEM image of an exemplary interconnect material (LSTN6.0-3Y5) that includes a ceramic interconnect material and partially stabilized zirconia, after a free sintering operation performed at a temperature of about 1320° C. for a time period of about one hour.

LSTN6.0, available from Saint-Gobain Corp., and partially stabilized zirconia (ZrO2 that is partially stabilized with about 3.0 mol % $Y_2O_3$), available from Tosoh USA, were ball milled to form a mixture. The partially stabilized zirconia was about 5 vol % of the total volume of the mixture. The resulting LSTN6.0-3Y5 mixture was free sintered at a temperature of about 1320° C. for a time period of about one hour. FIG. 20 is an SEM image at 10 k magnification after the free sintering operation.

Figure 21:
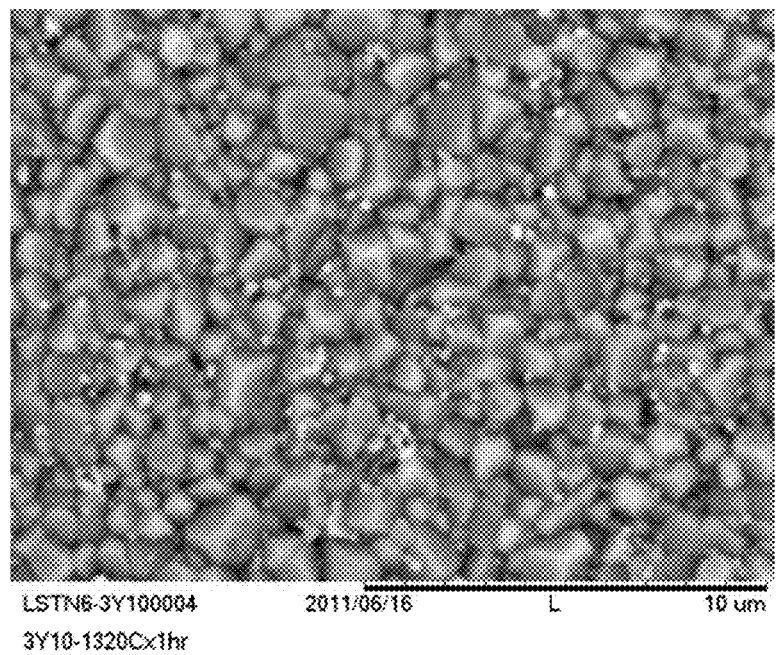
FIG. 21 includes an SEM image of an exemplary interconnect material (LSTN6.0-3Y10) that includes a ceramic interconnect material and partially stabilized zirconia, after a free sintering operation performed at a temperature of about 1320° C. for a time period of about one hour.

LSTN6.0 and partially stabilized zirconia (ZrO2 that is partially stabilized with about 3.0 mol % $Y_2O_3$) were ball milled to form a mixture. The partially stabilized zirconia was about 10 vol % of the total volume of the mixture. The resulting LSTN6.0-3Y10 mixture was free sintered at a temperature of about 1320° C. for a time period of about one hour. FIG. 21 is an SEM image at 10 k magnification after the free sintering operation.

Figure 22:
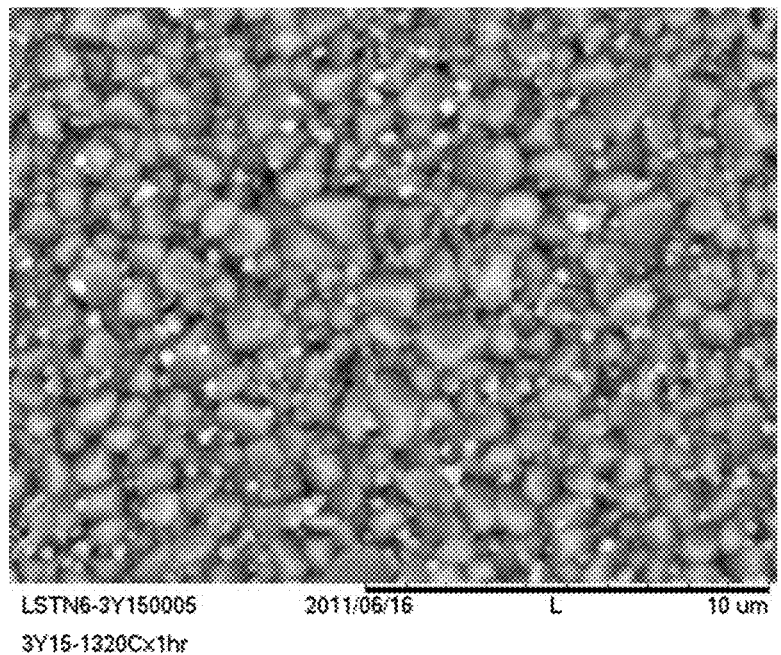
FIG. 22 includes an SEM image of an exemplary interconnect material (LSTN6.0-3Y15) that includes a ceramic interconnect material and partially stabilized zirconia, after a free sintering operation performed at a temperature of about 1320° C. for a time period of about one hour.

LSTN6.0 and partially stabilized zirconia (ZrO2 that is partially stabilized with about 3.0 mol % $Y_2O_3$) were ball milled to form a mixture. The partially stabilized zirconia was about 15 vol % of the total volume of the mixture. The resulting LSTN6.0-3Y15 mixture was free sintered at a temperature of about 1320° C. for a time period of about one hour. FIG. 22 is an SEM image at 10 k magnification after the free sintering operation.

Figure 23:
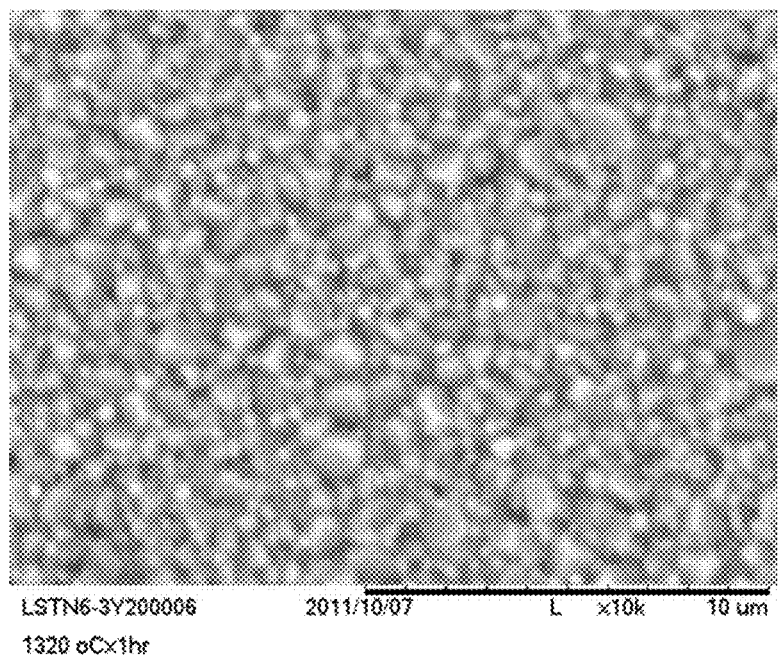
FIG. 23 includes an SEM image of an exemplary interconnect material (LSTN6.0-3Y20) that includes a ceramic interconnect material and partially stabilized zirconia, after a free sintering operation performed at a temperature of about 1320° C. for a time period of about one hour.

LSTN6.0 and partially stabilized zirconia (ZrO2 that is partially stabilized with about 3.0 mol % $Y_2O_3$) were ball milled to form a mixture. The partially stabilized zirconia was about 20 vol % of the total volume of the mixture. The resulting LSTN6.0-3Y20 mixture was free sintered at a temperature of about 1320° C. for a time period of about one hour. FIG. 23 is an SEM image at 10 k magnification after the free sintering operation.

The relative density of each of the exemplary interconnect materials (LSTN6.0-3Y5, LSTN6.0-3Y10, LSTN6.0-3Y15, and LSTN6.0-3Y20) was determined after the free sintering operation. The relative density was determined as described in Example 2.

For example, the relative density of LSTN6.0-3Y5 was determined to be about 102.3% of theoretical density after the free sintering operation. The relative density of LSTN6.0-3Y10 was determined to be about 102.7%, the relative density of LSTN6.0-3Y15 was determined to be about 102.4%, and the relative density of LSTN6.0-3Y20 was determined to be about 102.2%.

The biaxial flexure strength of each of the exemplary interconnect materials (LSTN6.0-3Y5, LSTN6.0-3Y10, LSTN6.0-3Y15, and LSTN6.0-3Y20) was measured after the free sintering operation. The biaxial flexure strength testing was performed as described in Example 2.

Figure 24:
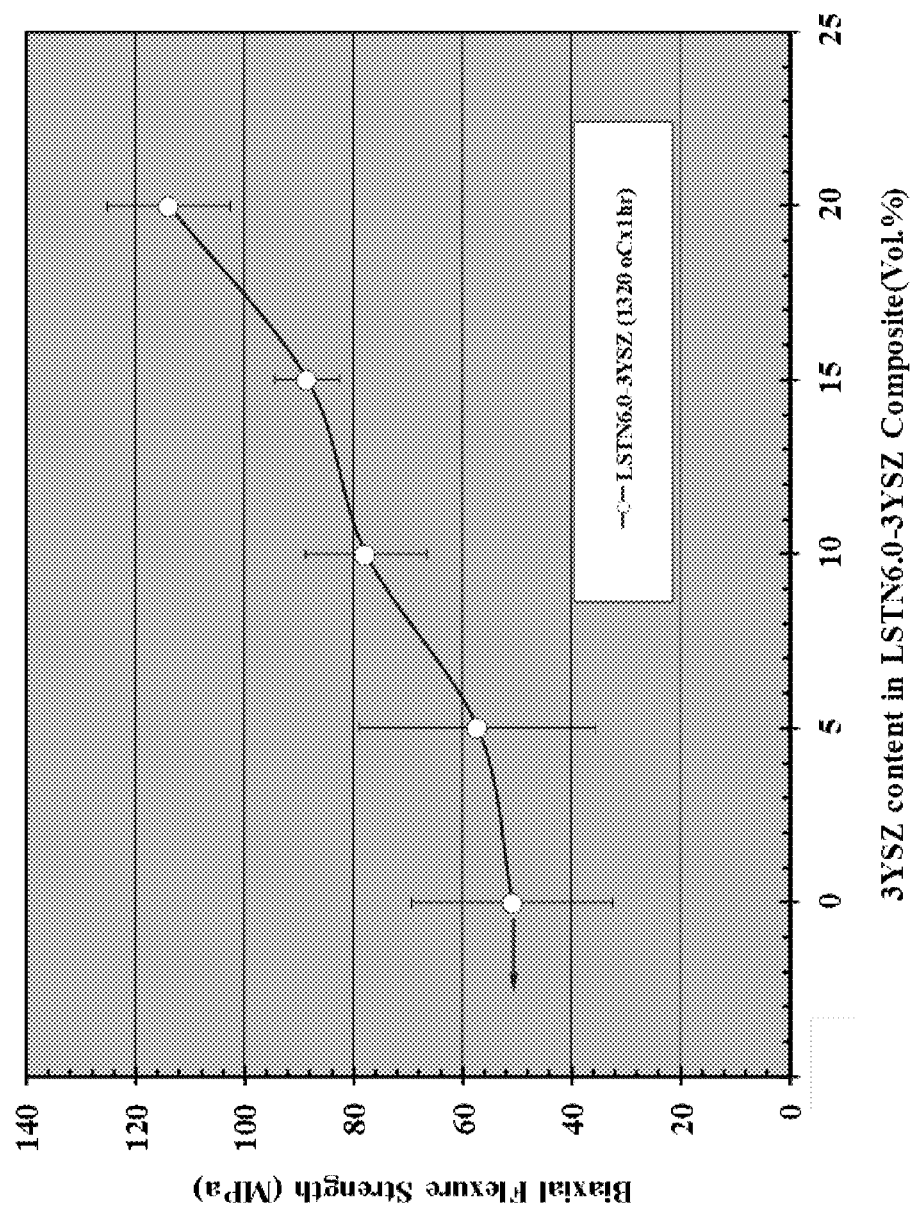
FIG. 24 illustrates the biaxial flexure strength (MPa) of exemplary interconnect materials that include a ceramic interconnect material and partially stabilized zirconia according to the volume percentage of partially stabilized zirconia, as measured after a free sintering operation performed at a temperature of about 1320° C. for a time period of about one hour.

FIG. 24 illustrates the biaxial flexure strength (MPa) of each of the exemplary interconnect materials (LSTN6.0-3Y5, LSTN6.0-3Y10, LSTN6.0-3Y15, and LSTN6.0-3Y20).

For example, the biaxial flexure strength of LSTN6.0-3Y5 was determined to be about 57.2 MPa after the free sintering operation, compared to a biaxial flexure strength of 50.8 MPa for LSTN6.0. The biaxial flexure strength of LSTN6.0-3Y10 was determined to be about 77.7 MPa, the biaxial flexure strength of LSTN6.0-3Y15 was determined to be about 88.5 MPa, and the biaxial flexure strength of LSTN6.0-3Y20 was determined to be 113.92 MPa.

Example 6

LST28, available from American Elements (Los Angeles, Calif.), and partially stabilized zirconia (ZrO2 that is partially stabilized with about 3.0 mol % $Y_2O_3$), available from Tosoh USA, were ball milled to form a mixture. The partially stabilized zirconia was about 5 vol % of the total volume of the mixture. The resulting LST28-3Y5 mixture was free sintered at a temperature of about 1500° C. for a time period of about six hours.

The chemical expansion of each of the exemplary interconnect materials was measured in the dilatometry on the bar samples (4 mm×5 mm×30 mm) after free sintering at a temperature of about 1500° C. for a time period of about six hours following the following procedure. The bar samples were heated up to 1200° C. at a heating rate of 5° C./min in air and the CTE of each sample was measured during heating. The bar samples were then cooled down to 900° C. at 5° C./min and holding in air for one hour, then switching to nitrogen for another one hour; finally switching to 4% $H_2$+96% $N_2$ forming gas and holding for twelve hours. The percent of the bar sample expansion during holding in the forming gas was determined as the chemical expansion for each of the exemplary interconnect materials.

LST28 and partially stabilized zirconia (ZrO2 that is partially stabilized with about 3.0 mol % $Y_2O_3$) were ball milled to form a mixture. The partially stabilized zirconia was about 10 vol % of the total volume of the mixture. The resulting LST28-3Y10 mixture was free sintered at a temperature of about 1500° C. for a time period of about six hours. The chemical expansion test described above for LST28-3Y5 was performed on the LST28-3Y10 after the free sintering operation.

LST28 and partially stabilized zirconia (ZrO2 that is partially stabilized with about 3.0 mol % $Y_2O_3$) were ball milled to form a mixture. The partially stabilized zirconia was about 15 vol % of the total volume of the mixture. The resulting LST28-3Y15 mixture was free sintered at a temperature of about 1500° C. for a time period of about six hours. The chemical expansion test described above was performed on the LST28-3Y15 after the free sintering operation.

LST28 and partially stabilized zirconia (ZrO2 that is partially stabilized with about 3.0 mol % $Y_2O_3$) were ball milled to form a mixture. The partially stabilized zirconia was about 20 vol % of the total volume of the mixture. The resulting LST28-3Y20 mixture was free sintered at a temperature of about 1500° C. for a time period of about six hours. The chemical expansion test described above was performed on the LST28-3Y20 after the free sintering operation.

Figure 25:
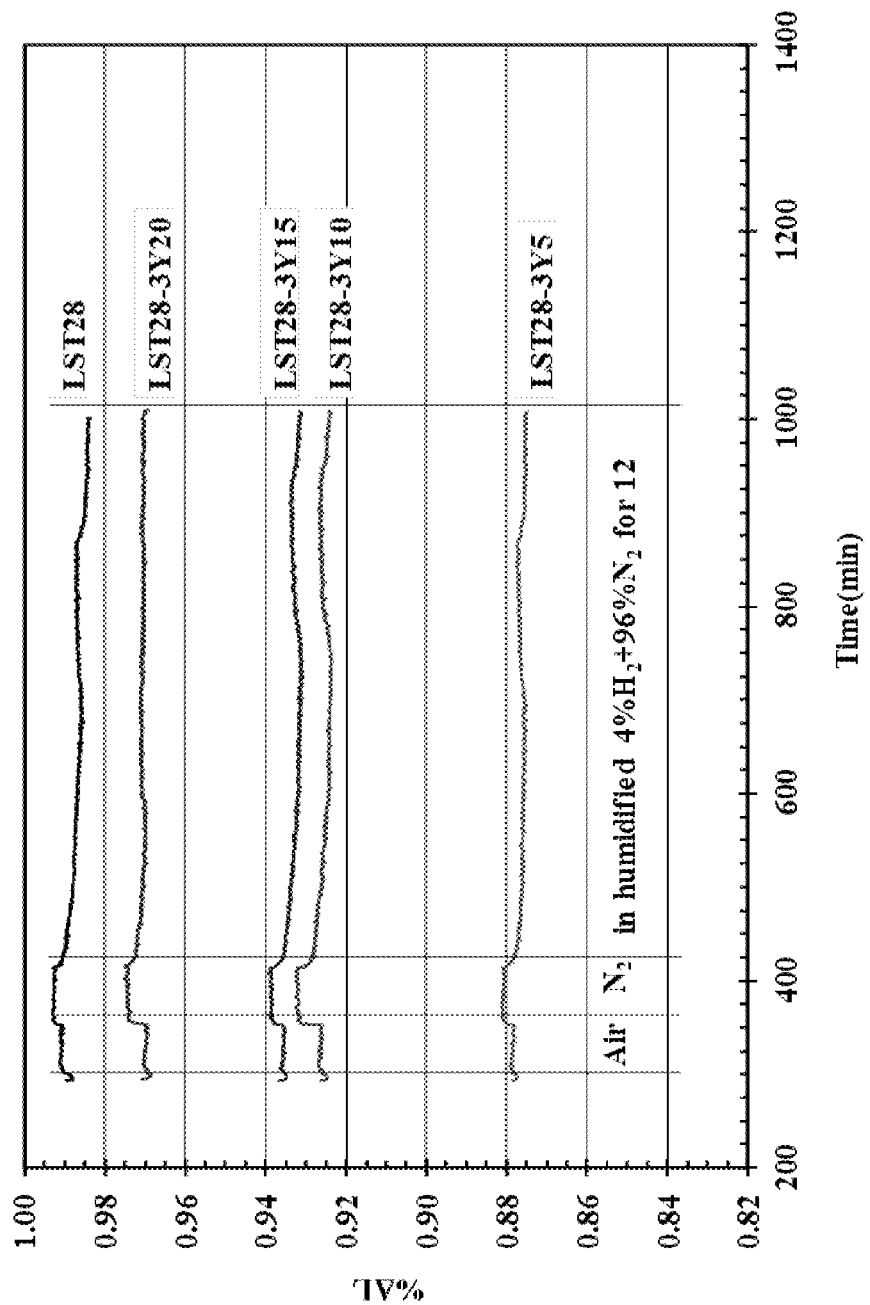
FIG. 25 illustrates the chemical expansion of exemplary interconnect materials that include an LST ceramic interconnect material and partially stabilized zirconia.

FIG. 25 illustrates the chemical expansion of each the exemplary interconnect materials (LST28-3Y5, LST28-3Y10, LST28-3Y15, and LST28-3Y20), compared to LST28.

Example 7

LSTN4.0, available from Saint-Gobain Corp., and partially stabilized zirconia (ZrO2 that is partially stabilized with about 3.0 mol % $Y_2O_3$), available from Tosoh USA, were ball milled to form a mixture. The partially stabilized zirconia was about 5 vol % of the total volume of the mixture. The resulting LSTN4.0-3Y5 mixture was free sintered at a temperature of about 1500° C. for a time period of about six hours. The chemical expansion test described in Example 6 was performed on the LSTN4.0-3Y5 after the free sintering operation.

LSTN4.0 and partially stabilized zirconia (ZrO2 that is partially stabilized with about 3.0 mol % $Y_2O_3$) were ball milled to form a mixture. The partially stabilized zirconia was about 10 vol % of the total volume of the mixture. The resulting LSTN4.0-3Y10 mixture was free sintered at a temperature of about 1500° C. for a time period of about six hours. The chemical expansion test described in Example 6 was performed on the LSTN4.0-3Y10 after the free sintering operation.

LSTN4.0 and partially stabilized zirconia (ZrO2 that is partially stabilized with about 3.0 mol % $Y_2O_3$) were ball milled to form a mixture. The partially stabilized zirconia was about 15 vol % of the total volume of the mixture. The resulting LSTN4.0-3Y15 mixture was free sintered at a temperature of about 1500° C. for a time period of about six hours. The chemical expansion test described in Example 6 was performed on the LSTN4.0-3Y15 after the free sintering operation.

LSTN4.0 and partially stabilized zirconia ($ZrO2$ that is partially stabilized with about 3.0 mol % $Y_2O_3$) were ball milled to form a mixture. The partially stabilized zirconia was about 20 vol % of the total volume of the mixture. The resulting LSTN4.0-3Y20 mixture was free sintered at a temperature of about 1500° C. for a time period of about six hours. The chemical expansion test described in Example 6 was performed on the LSTN4.0-3Y20 after the free sintering operation.

LSTN6.0, available from Saint-Gobain Corp., and partially stabilized zirconia ($ZrO2$ that is partially stabilized with about 3.0 mol % $Y_2O_3$), available from Tosoh USA, were ball milled to form a mixture. The partially stabilized zirconia was about 20 vol % of the total volume of the mixture. The resulting LSTN6.0-3Y20 mixture was free sintered at a temperature of about 1500° C. for a time period of about six hours. The chemical expansion test described in Example 6 was performed on the LSTN6.0-3Y20 after the free sintering operation.

Figure 26:
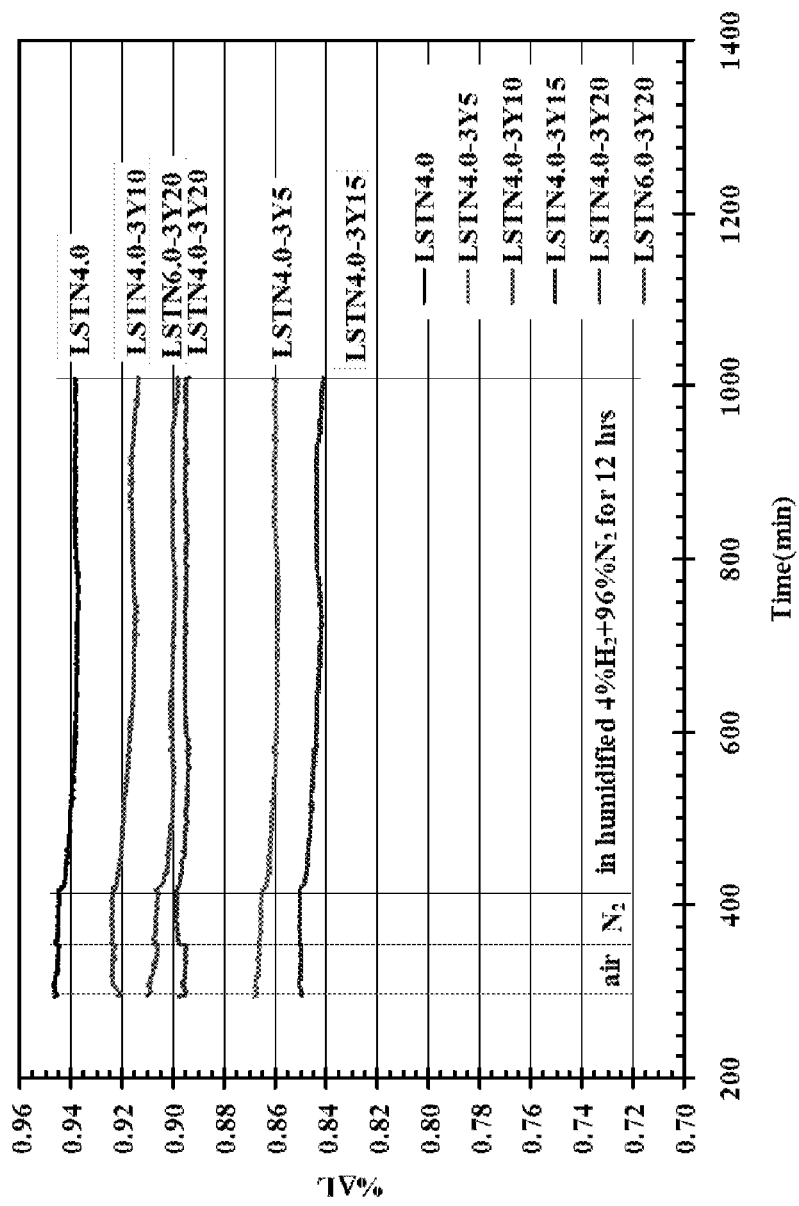
FIG. 26 illustrates the chemical expansion of exemplary interconnect materials that include an LSTN ceramic interconnect material and partially stabilized zirconia.

FIG. 26 illustrates the chemical expansion of each the exemplary interconnect materials (LSTN4.0-3Y5, LSTN4.0-3Y10, LSTN4.0-3Y15, LSTN4.0-3Y20, and LSTN6.0-3Y20), compared to LSTN4.0.

Example 8

LST28, available from American Elements (Los Angeles, Calif.), and partially stabilized zirconia ($ZrO2$ that is partially stabilized with about 3.0 mol % $Y_2O_3$), available from Tosoh USA, were ball milled to form a mixture. The partially stabilized zirconia was about 5 vol % of the total volume of the mixture. The resulting LST28-3Y5 mixture was free sintered at a temperature of about 1500° C. for a time period of about six hours. Conductivity tests were performed in a forming gas atmosphere of about 4 mol % $H_2$ and about 96 mol % $N_2$ at a temperature of about 1000° C.

The volume electric conductivity of each of the exemplary interconnect materials was measured with a 4-probe method on the bar samples (4 mm×5 mm×30 mm) after free sintering at a temperature of about 1500° C. for a time period of about six hours in air. The bar samples were held in forming gas at a temperature of about 800° C. for a time period of about 16 hours. The bar samples were then heated up to a high temperature of about 1000° C. at a heating rate of 5° C./min and held for about 4 hours in forming gas, and the conductivity at 1000° C. was measured by passing a constant current through two probes and measuring the voltage drop in another two probes and calculated with the ohm law.

LST28 and partially stabilized zirconia ($ZrO_2$ that is partially stabilized with about 3.0 mol % $Y_2O_3$) were ball milled to form a mixture. The partially stabilized zirconia was about 10 vol % of the total volume of the mixture. The resulting LST28-3Y10 mixture was free sintered at a temperature of about 1500° C. for a time period of about six hours. The conductivity tests described above were performed on the LST28-3Y10 after the free sintering operation.

LST28 and partially stabilized zirconia ($ZrO_2$ that is partially stabilized with about 3.0 mol % $Y_2O_3$) were ball milled to form a mixture. The partially stabilized zirconia was about 15 vol % of the total volume of the mixture. The resulting LST28-3Y15 mixture was free sintered at a temperature of about 1500° C. for a time period of about six hours. The conductivity tests described above were performed on the LST28-3Y15 after the free sintering operation.

LST28 and partially stabilized zirconia ($ZrO_2$ that is partially stabilized with about 3.0 mol % $Y_2O_3$) were ball milled to form a mixture. The partially stabilized zirconia was about 20 vol % of the total volume of the mixture. The resulting LST28-3Y20 mixture was free sintered at a temperature of about 1500° C. for a time period of about six hours. The conductivity tests described above were performed on the LST28-3Y20 after the free sintering operation.

Figure 27:
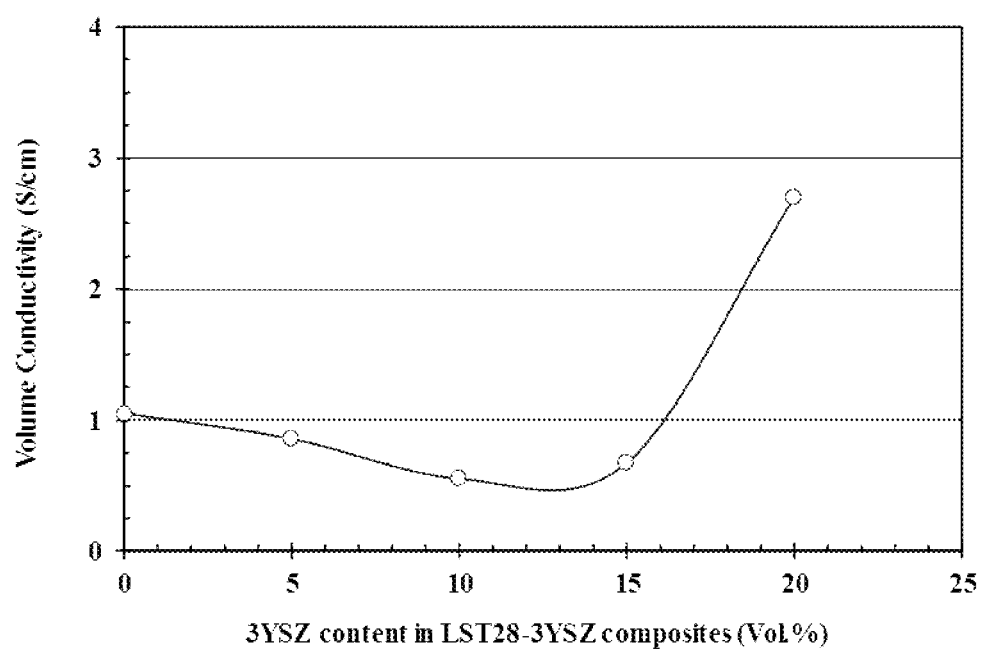
FIG. 27 illustrates the volume conductivity (S/cm) of exemplary interconnect materials that include an LST ceramic interconnect material and partially stabilized zirconia according to the volume percentage of partially stabilized zirconia, as measured in forming gas atmosphere at a temperature of about 1000° C.

FIG. 27 illustrates the volume conductivity (S/cm) of each the exemplary interconnect materials (LST28-3Y5, LST28-3Y10, LST28-3Y15, and LST28-3Y20), as measured in forming gas atmosphere at a temperature of about 1000° C.

Example 9

LSTN4.0, available from Saint-Gobain Corp., and partially stabilized zirconia ($ZrO_2$ that is partially stabilized with about 3.0 mol % $Y_2O_3$), available from Tosoh USA, were ball milled to form a mixture. The partially stabilized zirconia was about 5 vol % of the total volume of the mixture. The resulting LSTN4.0-3Y5 mixture was free sintered at a temperature of about 1500° C. for a time period of about six hours. Conductivity tests, as described in Example 8, were performed in a forming gas atmosphere of about 4 mol % $H_2$ and about 96 mol % $N_2$ at a temperature of about 800° C., at a temperature of about 900° C., and at a temperature of about 1000° C.

LSTN4.0 and partially stabilized zirconia ($ZrO_2$ that is partially stabilized with about 3.0 mol % $Y_2O_3$) were ball milled to form a mixture. The partially stabilized zirconia was about 10 vol % of the total volume of the mixture. The resulting LSTN4.0-3Y10 mixture was free sintered at a temperature of about 1500° C. for a time period of about six hours. The conductivity tests described above were performed on the LSTN4.0-3Y10 after the free sintering operation.

LSTN4.0 and partially stabilized zirconia ($ZrO_2$ that is partially stabilized with about 3.0 mol % $Y_2O_3$) were ball milled to form a mixture. The partially stabilized zirconia was about 15 vol % of the total volume of the mixture. The resulting LSTN4.0-3Y15 mixture was free sintered at a temperature of about 1500° C. for a time period of about six hours. The conductivity tests described above were performed on the LSTN4.0-3Y15 after the free sintering operation.

LSTN4.0 and partially stabilized zirconia ($ZrO_2$ that is partially stabilized with about 3.0 mol % $Y_2O_3$) were ball milled to form a mixture. The partially stabilized zirconia was about 20 vol % of the total volume of the mixture. The resulting LSTN4.0-3Y20 mixture was free sintered at a temperature of about 1500° C. for a time period of about six hours. The conductivity tests described above were performed on the LSTN4.0-3Y20 after the free sintering operation.

Figure 28:
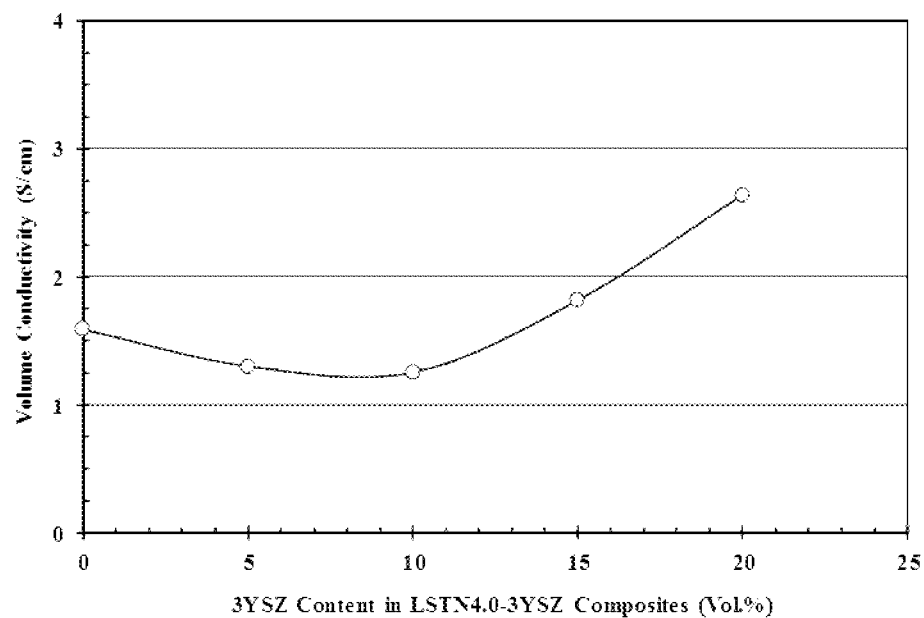
FIG. 28 illustrates the volume conductivity (S/cm) of exemplary interconnect materials that include an LSTN4.0 ceramic interconnect material and partially stabilized zirconia according to the volume percentage of partially stabilized zirconia, as measured in forming gas atmosphere at a temperature of about 1000° C.

FIG. 28 illustrates the volume conductivity (S/cm) of each the exemplary interconnect materials (LSTN4.0-3Y5, LSTN4.0-3Y10, LSTN4.0-3Y15, and LSTN4.0-3Y20), as measured in forming gas atmosphere at a temperature of about 1000° C.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A solid oxide fuel cell article comprising:
   a cathode overlying an anode;
   an interconnect disposed between the cathode and the anode, the interconnect comprising a first phase including a ceramic interconnect material including an electrically conductive ceramic material and a second phase including partially stabilized zirconia in a range of between about 1 vol % and about 70 vol % of a total volume of the interconnect, wherein the second phase is substantially uniformly dispersed in the first phase;
   a first electrolyte overlying the cathode; and
   a second electrolyte, wherein the anode overlies the second electrolyte,
   wherein the interconnect comprises:
   a first discrete interconnect layer at a cathode interface having a first concentration of the partially stabilized zirconia; and
   a second discrete interconnect layer at an anode interface having a second concentration of the partially stabilized zirconia, the first concentration being lower than the second concentration.

2. The solid oxide fuel cell article of claim 1, wherein the electrically conductive ceramic material is in a range of between about 5 vol % and about 70 vol %.

3. The solid oxide fuel cell article of claim 1, wherein the partially stabilized zirconia is in a range of between about 10 vol % and about 50 vol % of the total volume of the interconnect.

4. The solid oxide fuel cell article of claim 1, wherein the first discrete interconnect layer includes substantially no partially stabilized zirconia.

5. The solid oxide fuel cell article of claim 1, wherein the interconnect has a biaxial flexure strength of not less than about 40 MPa and not greater than about 200 MPa.

6. The solid oxide fuel cell article of claim 1, wherein the interconnect has a volume conductivity in a forming gas atmosphere comprising about 4 vol % $H_2$ and about 96 vol % $N_2$ of not less than about 1 S/cm and not greater than about 25 S/cm.

7. The solid oxide fuel cell article of claim 1, wherein the second phase including partially stabilized zirconia is configured to phase transform between a tetragonal structure and a monoclinic structure, wherein the second phase is configured to change volume during the phase transformation, wherein the change in volume is in a range of between about 3 vol % and about 5 vol %.

8. The solid oxide fuel cell article of claim 1, wherein the partially stabilized zirconia includes $ZrO_2$ and a stabilizing oxide.

9. The solid oxide fuel cell article of claim 8, wherein the partially stabilized zirconia includes not less than about 0.1 mol % stabilizing oxide of the total moles of the partially stabilized zirconia, and wherein the partially stabilized zirconia includes not greater than about 8.0 mol % stabilizing oxide of the total moles of the partially stabilized zirconia.

10. The solid oxide fuel cell article of claim 8, wherein the stabilizing oxide includes at least one stabilizing oxide selected from the group consisting of $Y_2O_3$, $CeO_2$, CaO, and MgO.

11. The solid oxide fuel cell article of claim 1, wherein the ceramic interconnect material includes $La_xSr_{1-x}TiO_3$, wherein x is not less than about 0.001 and x is not greater than about 0.50.

12. The solid oxide fuel cell article of claim 1, wherein the ceramic interconnect material includes $La_xSr_{1-x}Ti_{1-y}Nb_yO_3$, wherein x is not less than about 0.001 and x is not greater than about 0.50, and wherein y is not less than about 0.001 and y is not greater than about 0.25.

13. The solid oxide fuel cell article of claim 1, wherein the ceramic interconnect material includes $La_xSr_{1-x}Ti_{1-y}Mn_yO_3$, wherein x is not less than about 0.001 and x is not greater than about 0.50, and wherein y is not less than about 0.001 and y is not greater than about 0.70.

14. The solid oxide fuel cell article of claim 1, wherein the ceramic interconnect material includes $Sr_{1-1.5z}Y_zTiO_3$, wherein z is not less than about 0.001 and z is not greater than about 0.30.

15. The solid oxide fuel cell article of claim 1, wherein the ceramic interconnect material includes $Sr_{1-0.5k}Nb_kTi_{1-k}O_3$, wherein k is not less than about 0.001 and k is not greater than about 0.30.

16. The solid oxide fuel cell article of claim 1, wherein the porosity of the interconnect is not less than about 0.05 vol % and not greater than about 5 vol %.

17. A solid oxide fuel cell article, comprising:
   a cathode;
   an electrolyte overlying the cathode;
   an anode overlying the electrolyte; and
   an interconnect overlying the anode,
   wherein the interconnect is spaced apart from the electrolyte and comprises:
   a first phase comprising a ceramic interconnect material including $La_xSr_{1-x}TiO_3$, wherein x is not less than about 0.001 and x is not greater than about 0.50; and
   a second phase comprising partially stabilized zirconia; and
   wherein the interconnect comprises:
   a first discrete interconnect layer having a first concentration of the partially stabilized zirconia; and
   a second discrete interconnect layer having a second concentration of the partially stabilized zirconia, the first concentration being lower than the second concentration.

18. The solid oxide fuel cell article of claim 17, wherein the ceramic interconnect material including $La_xSr_{1-x}TiO_3$ is further doped with a dopant including Nb or Mn.

* * * * *